US012562831B2

(12) United States Patent
Kosaka et al.

(10) Patent No.: US 12,562,831 B2
(45) Date of Patent: Feb. 24, 2026

(54) INFORMATION PROCESSING APPARATUS AND INFORMATION PROCESSING METHOD, AND COMPUTER PROGRAM

(71) Applicant: Sony Group Corporation, Tokyo (JP)

(72) Inventors: Yoshihiro Kosaka, Kanagawa (JP);
Hitoshi Nakamura, Kanagawa (JP);
Yusuke Ishikawa, Kanagawa (JP)

(73) Assignee: SONY GROUP CORPORATION,
Tokyo (JP)

( * ) Notice: Subject to any disclaimer, the term of this patent is extended or adjusted under 35 U.S.C. 154(b) by 487 days.

(21) Appl. No.: 18/019,373

(22) PCT Filed: Jul. 2, 2021

(86) PCT No.: PCT/JP2021/025160
§ 371 (c)(1),
(2) Date: Feb. 2, 2023

(87) PCT Pub. No.: WO2022/044544
PCT Pub. Date: Mar. 3, 2022

(65) Prior Publication Data
US 2023/0269017 A1    Aug. 24, 2023

(30) Foreign Application Priority Data

Aug. 27, 2020    (JP) ................................. 2020-143321

(51) Int. Cl.
*H04J 3/06*        (2006.01)
*H04L 43/087*    (2022.01)
*H04L 43/0894*    (2022.01)

(52) U.S. Cl.
CPC .......... *H04J 3/0667* (2013.01); *H04L 43/087* (2013.01); *H04L 43/0894* (2013.01)

(58) Field of Classification Search
CPC ......... H04J 3/0667; H04J 3/14; H04L 43/087; H04L 43/0894; H04L 43/0829; H04L 43/0864
See application file for complete search history.

(56) References Cited

U.S. PATENT DOCUMENTS 9,271,247 B1    2/2016 Pearson et al.
10,355,800 B2    7/2019 Ruffini et al.
(Continued)

FOREIGN PATENT DOCUMENTS

JP        2012-222833 A    11/2012
WO    WO 2012/174963 A1    12/2012

OTHER PUBLICATIONS

Geoffrey M. Garner, IEEE 1588 Version 2, Sep. 24, 2008, URL retrieved via: https://www.ieee802.org/1/files/public/docs2008/as-garner-1588v2-summary-0908.pdf (Year: 2008).*
(Continued)

*Primary Examiner* — Schquita D Goodwin
(74) *Attorney, Agent, or Firm* — Paratus Law Group, PLLC

(57)        ABSTRACT

There is provided an information processing apparatus that processes information regarding network environment resistance when performing time synchronization of devices. The information processing apparatus includes a control unit that associates a boundary clock function retaining device having a boundary clock function with network environment resistance index information indicating resistance to a network environment related to time synchronization of the boundary clock function retaining device. The network environment resistance index information is information indicating accuracy of the time synchronization of the boundary clock function retaining device corresponding to network environment information indicating the network environment.

20 Claims, 29 Drawing Sheets

(56) References Cited

U.S. PATENT DOCUMENTS

| | | | |
|---|---|---|---|
| 2011/0170534 A1* | 7/2011 | York | H04J 3/0667 |
| | | | 702/89 |
| 2012/0275501 A1 | 11/2012 | Rotenstein | |
| 2014/0119390 A1* | 5/2014 | Rabinovich | H04J 3/0638 |
| | | | 370/503 |
| 2018/0062780 A1 | 3/2018 | Shimizu | |
| 2019/0116021 A1* | 4/2019 | Tanwar | H04J 3/0673 |
| 2021/0006344 A1* | 1/2021 | Chen | G01S 19/14 |
| 2021/0028876 A1* | 1/2021 | Beardsley | H04J 3/0641 |
| 2022/0369251 A1* | 11/2022 | Medeiros | H04W 56/001 |

OTHER PUBLICATIONS

Dari Kuhn et. al., "Boundary Clock over multiple Ordinary Clocks", ip.com, ip.com Inc., West Henrietta, NY, US, Feb. 8, 2017 (Feb. 8, 2017), XP013174271; ISSN: 1533-0001.
Horita Koki et al: "PTP Accuracy Measurement Comparison Between Boundary Clock And VLAN Priority", 2017 IEEE International Symposium on Precision Clock Synchronization for Measurement, Control, and Communication (ISPCS), IEEE, Aug. 28, 2017.

* cited by examiner

*FIG. 2*

TIME SYNCHRONIZATION SYSTEM 200

TIME SYNCHRONIZATION SYSTEM 400

*FIG. 4B*

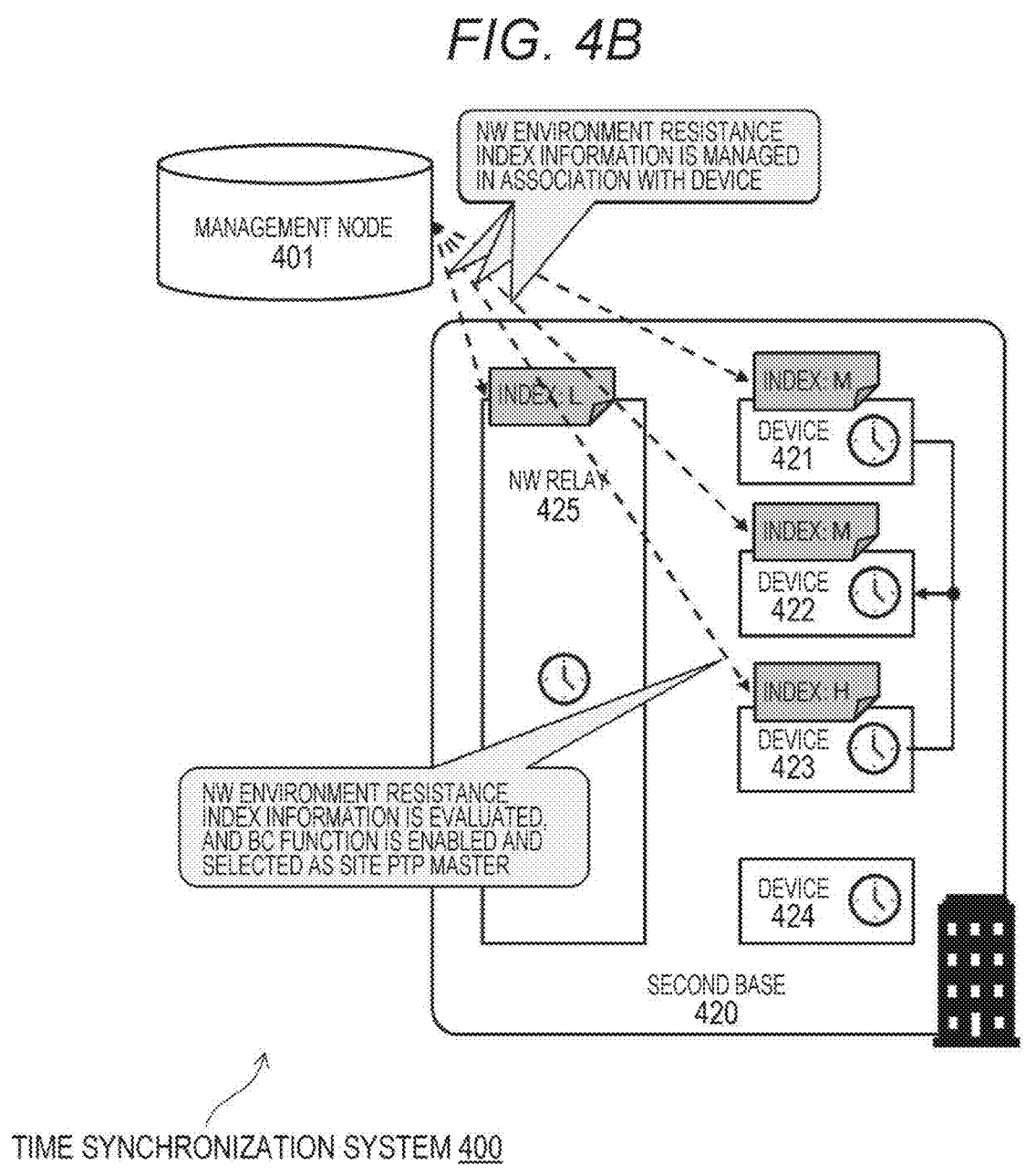

NW ENVIRONMENT RESISTANCE INDEX INFORMATION IS MANAGED IN ASSOCIATION WITH DEVICE

MANAGEMENT NODE
401

INDEX: L

NW RELAY
425

INDEX: M
DEVICE
421

INDEX: M
DEVICE
422

INDEX: H
DEVICE
423

DEVICE
424

NW ENVIRONMENT RESISTANCE INDEX INFORMATION IS EVALUATED, AND BC FUNCTION IS ENABLED AND SELECTED AS SITE PTP MASTER

SECOND BASE
420

TIME SYNCHRONIZATION SYSTEM 400

TIME SYNCHRONIZATION SYSTEM 2100

INFORMATION PROCESSING APPARATUS AND INFORMATION PROCESSING METHOD, AND COMPUTER PROGRAM

CROSS REFERENCE TO PRIOR APPLICATION

This application is a National Stage Patent Application of PCT International Patent Application No. PCT/JP2021/025160 (filed on Jul. 2, 2021) under 35 U.S.C. § 371, which claims priority to Japanese Patent Application No. 2020-143321 (filed on Aug. 27, 2020), which are all hereby incorporated by reference in their entirety.

TECHNICAL FIELD

The technology disclosed in the present description (hereinafter, "the present disclosure") relates to an information processing apparatus, an information processing method, and a computer program that process information regarding time synchronization of devices.

BACKGROUND ART

Precision time protocol (PTP) defined in IEEE 1588 is known as a means for performing time synchronization between devices on a network with high accuracy of microseconds or more. In PTP, a message to be exchanged to establish synchronization between the PTP master and the PTP slave is defined. Hereinafter, a network relay compatible with PTP is also referred to as a PTP compatible device. Furthermore, a master synchronized with a reference time of a global positioning system (GPS) or the like is called a grand master.

The PTP compatible device includes a PTP master and a PTP slave. One PTP compatible device may operate as both the PTP master and the PTP slave. For example, a relay compatible with PTP operates as a PTP master for a certain device to perform time synchronization of the device, and performs time synchronization as a PTP slave for another device. Furthermore, each PTP compatible device connected to the relay can also be switched to either the PTP master or the PTP slave.

Furthermore, a PTP compatible device such as a relay can remove variations in packet delay (jitter) in the network by using a boundary clock (BC) function. However, synchronization performance of a synchronization circuit of the network relay is generally optimized on the premise of direct connection with a cable, and thus synchronization cannot be performed in a poor (for example, a packet drop rate is high, a delay jitter amount is large, or the like) network environment in many cases. In a case where the motivation characteristics of the relay are not suitable for the characteristics of the network line, there is a case where synchronization as a PTP slave cannot be performed, and even if the BC function is enabled, a jitter of the network line cannot be removed, and devices of the entire system cannot be synchronized.

It is desirable to enable the BC function of the PTP compatible device that has a characteristic of easy time synchronization in the provided network line. However, it is difficult to select an optimal PTP compatible device on the basis of the characteristic with respect to network line quality. IEEE 1588 defines PTP via a local area network (LAN), and IEEE 1588 v2 further defines PTP compatible with a wide area network (WAN), but does not define characteristics related to the time synchronization of the PTP compatible device in a network environment. Furthermore, SMPTE (Society of Motion Picture and Television Engineers) 2059-2 defines a PTP broadcast profile, but does not define characteristics related to time synchronization of a PTP compatible device in a network environment.

For example, a device for selecting an optimal path between a PTP master and a PTP slave by monitoring performance of a network path using an examination packet has been proposed (see Patent Document 1), but path selection is not performed on the basis of characteristics of a PTP compatible device.

Furthermore, a method of evaluating a synchronization feature of a PTP compatible device by packet drop and guaranteeing network line quality on the basis of a pattern of the packet drop has been proposed (see Patent Document 2), but the method is not a method of processing a characteristic in a network environment that can be a determination criterion for enabling the BC function. Note that, in this method, the quality of the entire network line is improved in accordance with a device having the lowest synchronization performance to thereby prevent deterioration of synchronization accuracy, and thus cost effectiveness is not realistic.

CITATION LIST

Patent Document

Patent Document 1: U.S. patent Ser. No. 10/355,800
Patent Document 2: U.S. Pat. No. 9,271,247

SUMMARY OF THE INVENTION

Problems to be Solved by the Invention

An object of the present disclosure is to provide an information processing apparatus, an information processing method, and a computer program for processing characteristic information regarding easiness of time synchronization of a device in a network environment.

Solutions to Problems

The present disclosure has been made in view of the above problems, and a first aspect thereof is an information processing apparatus including a control unit that associates a boundary clock function retaining device having a boundary clock function with network environment resistance index information indicating resistance to a network environment related to time synchronization of the boundary clock function retaining device.

The network environment resistance index information is information indicating accuracy of the time synchronization of the boundary clock function retaining device corresponding to network environment information indicating the network environment. Alternatively, the network environment resistance index information is the network environment resistance index information is information indicating the network environment in a case where accuracy of the time synchronization of the boundary clock function retaining device is equal to or more than a predetermined value.

Furthermore, the network environment information indicating the network environment is network load information indicating strength of a network load related to the boundary clock function retaining device. The network load information is information generated on the basis of packet transfer jitter information indicating a packet transfer jitter and packet transfer delay information indicating a packet transfer delay. The packet transfer jitter information has a higher contribution rate to the network load information than the packet transfer delay information.

The control unit determines, from among a plurality of the boundary clock function retaining devices connected to a first network line, a first intra-network line master device that performs time synchronization with a second intra-network line device connected by a second network line different from the first network line on the basis of the network environment resistance index information associated with each of the boundary clock function retaining devices.

Furthermore, a second aspect of the present disclosure is an information processing method including a control step of associating a boundary clock function retaining device having a boundary clock function with network environment resistance index information indicating resistance to a network environment related to time synchronization of the boundary clock function retaining device.

Furthermore, a third aspect of the present disclosure is a computer program described in a computer-readable form, the computer program causing a computer to function as a control unit that associates a boundary clock function retaining device having a boundary clock function with network environment resistance index information indicating resistance to a network environment related to time synchronization of the boundary clock function retaining device.

The computer program according to the third aspect of the present disclosure is such that a computer program described in a computer-readable format so as to implement predetermined processing on a computer is defined. In other words, by installing the computer program according to the third aspect of the present disclosure in a computer, a cooperative action is exerted on the computer, and similar operation and effect to those of the information processing apparatus according to the first aspect of the present disclosure can be obtained.

Effects of the Invention

According to the present disclosure, it is possible to provide an information processing apparatus, an information processing method, and a computer program that define network environment resistance index information indicating a system to a network environment regarding time synchronization of a device that has a boundary clock function and is compatible with PTP, and perform processing such as determination of on/off of the boundary clock function of each device, setting of master/slave, and domain change on the basis of the network environment resistance information of each device.

Note that the effects described in the present disclosure are merely examples, and the effects brought by the technology disclosed in the present description are not limited thereto. Furthermore, in addition to the above-described effects, the present disclosure may further exhibit additional effects.

Other objects, features, and advantages of the present disclosure will become apparent from a more detailed description based on embodiments described below and the accompanying drawings.

BRIEF DESCRIPTION OF DRAWINGS

FIG. 2 is a diagram illustrating an operation example of a time operation system 200.

FIG. 4B is a diagram illustrating how the time synchronization system 400 measures network environment resistance index information of each device.

FIG. 10 is a diagram illustrating an operation example of the time synchronization system 400.

FIG. 12 is a diagram illustrating an operation of a time synchronization system 1200 when a failure occurs.

FIG. 16 is a diagram illustrating an operation of the time synchronization system 1200 when a failure occurs.

FIG. 23 is a diagram illustrating the dynamic setting change process of the time synchronization system 2100 in consideration of the number of network hops.

MODE FOR CARRYING OUT THE INVENTION

Figure 1:
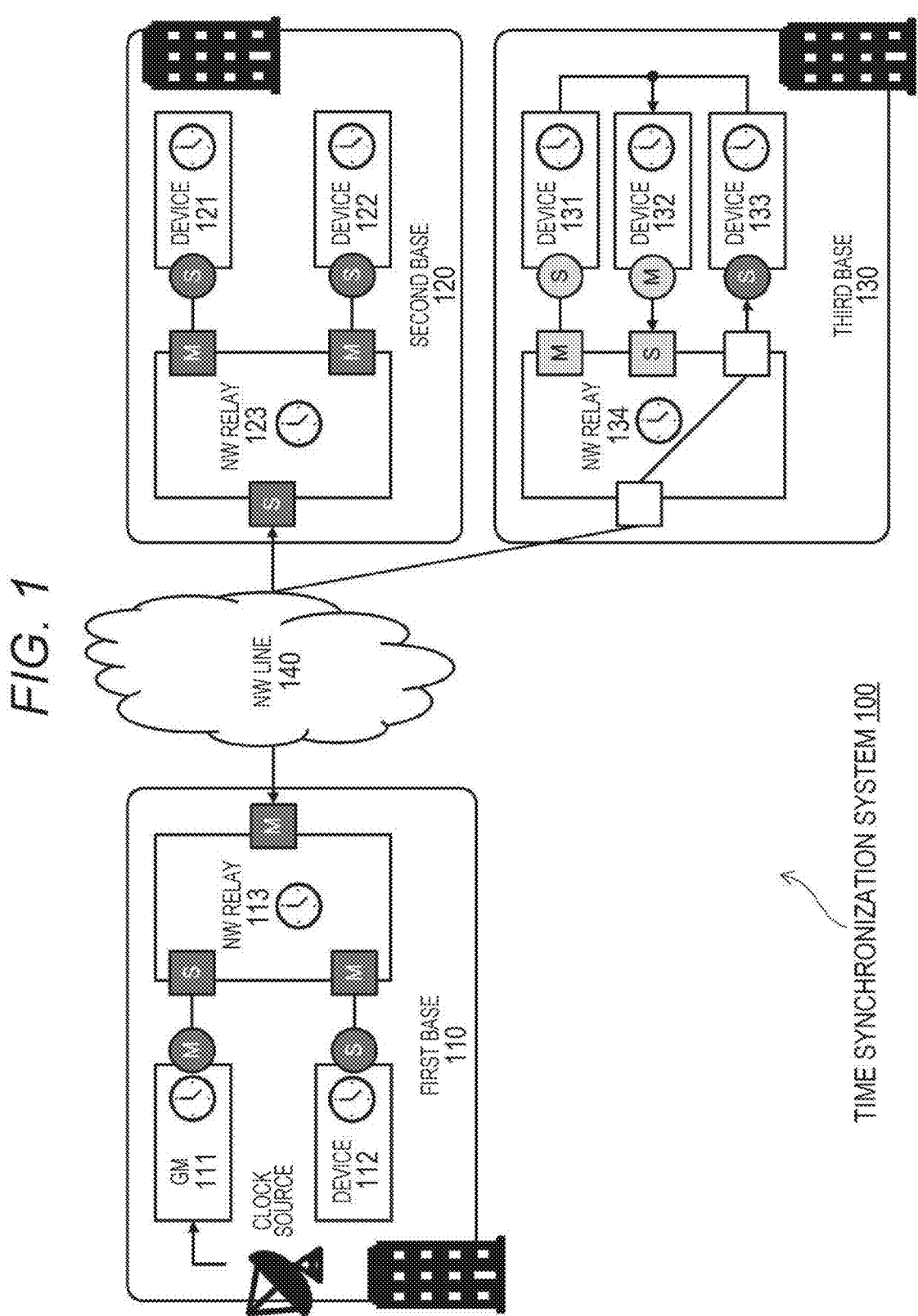
FIG. 1 is a diagram illustrating a configuration example of a time synchronization system 100.

Hereinafter, the present disclosure will be described in the following order with reference to the drawings.
  A. Time synchronization system
  B. Problem and solution regarding synchronization characteristics
  C. Evaluation of network environment resistance index information
  D. Selection and time synchronization of PTP slave based on network environment resistance index information
  E. Dynamic setting change process upon failure
  F. Timing of making determination using network environment resistance index information
  G. Dynamic setting process considering number of network hops
  H. Time synchronization possibility determination processing
  I. Effects
A. Time Synchronization System
  FIG. 1 schematically illustrates a configuration example of a time synchronization system 100 that performs time synchronization on the basis of PTP. In the illustrated time synchronization system 100, a first base 110, a second base 120, and a third base 130 are interconnected via a wide area network line 140. When the packet transfer of each base 110 to 130 is performed via the wide area network line 140, it is assumed that packet drop or a delay jitter occurs.

The base here refers to a site that constructs a small-scale network line such as a LAN. The site may be one building, one floor in a building, or a studio. Each base includes a network line laid in the base and an intra-network line device interconnected via the network line. In FIG. 1 (and drawings referred to in the following description), illustration of network lines in a base is omitted, and a configuration in which each intra-network line device is connected to a network relay that relays the wide area network line 140 is illustrated. In each base (or in a network line), basically, a master device synchronized with a reference time (an intra-network line master device, and hereinafter, also referred to as a "site PTP master" in the present description) is installed, and other intra-network line devices on the same base can synchronize with the reference time through the intra-network line master device. Furthermore, the master device that is equipped with a time source (basically, a GPS receiver) and acquires the reference time by itself is referred to as a grand master (GM). A base having the grand master is a GM base, and a base not having the grand master is a non-GM base. In the time synchronization system 100 illustrated in FIG. 1, the first base 110 is a GM base and the second base 120 and the third base 130 are non-GM bases. Time synchronization of the time synchronization system 100 is achieved by the second base 120 and the third base 130 performing time synchronization with the first base 110.

The first base 110 includes a grand master 111, a device 112, and a network relay 113 connected to another site via the wide area network line 140. Furthermore, the second base 120 includes a device 121, a device 122, and a network relay 123 connected to another site via the wide area network line 140. Furthermore, the third base 130 includes a device 131, a device 132, a device 133, and a network relay 134 connected to another site via the wide area network line 140. Note that each site 110 to 130 may further include a device (not illustrated).

Each device (including a grand master and a network relay) in each site 110 to 130 includes one or more ports for connecting to another device or the wide area network line 140. Each device can switch to one of the PTP master and the PTP slave to operate. Furthermore, in a case of a device that includes a plurality of ports and is simultaneously connected to a plurality of devices like a network relay, it is assumed that a relationship between the PTP master and the PTP slave can be set with a device connected at each port (for example, one network relay can be the PTP slave for a certain device and meanwhile can be the PTP master for another device). In addition, it is assumed that the network relay having a BC function can determine on/off of the BC function for each port.

In the first base 110 that is a GM base, the grand master 111 is synchronized with a reference time supplied from a clock source such as GPS. The network relay 113 operates as the PTP slave with respect to the grand master 111, and performs time synchronization with the grand master 111. Furthermore, the device 112 operates as the PTP slave and performs time synchronization with the network relay 113 as the PTP master.

In the non-GM base, for example, a device having a boundary clock (BC) function with the highest network environment resistance index among the devices in the non-GM base is selected as the site PTP master. Note that the network environment resistance index is information indicating accuracy of time synchronization of the BC function with respect to the network environment, and details thereof will be described later. The site PTP master performs time synchronization with the reference time as the PTP slave for a device (for example, a device in the GM base) that is time-synchronized with the reference time, and then provides the reference time in its own base.

In the second base 120, since the network relay 123 has the BC function with the highest network environment resistance index for the wide area network line 140, it is selected as the site PTP master. Therefore, the network relay 123 performs time synchronization as the PTP slave with respect to the network relay 113 in the GM base 110, and operates as the PTP master with respect to the device 121 and the device 122 in the second base 120, and the device 121 and the device 122 perform time synchronization with the network relay 123.

In the third base 130, since the device 133 has the BC function with the highest network environment resistance index for the wide area network line 140, it is selected as the site PTP master. Therefore, the device 133 operates as the PTP slave with respect to the network relay 113 in the GM base 110, and performs time synchronization with the reference time. In addition, the device 132 can be connected to the device 133, which is the site PTP master, through an external analog interface to perform time synchronization. The device 132 operates as the PTP master in another domain, and the network relay 134 performs, as the PTP slave, time synchronization with the device 132. Furthermore, the network relay 134 operates as the PTP master for the device 131, and the device 131 performs, as the PTP slave, time synchronization with the network relay 134.

Note that, in FIG. 1, in a case where the PTP compatible device is operating as the PTP master with respect to a peer, "M" is entered in the port connected to the peer, and in a case where the PTP compatible device is operating as the PTP slave with respect to a peer, "S" is entered in the port connected to the peer (the same applies to other drawings). Furthermore, in order to identify the domain of the time synchronization, the ports are colored with different shades of gray for each domain. In the example illustrated in FIG. 1, the first base 110, the second base 120, and the device 133 of the third base 130 belong to the same domain that is time-synchronized by the grand master 111. Furthermore, the device 131, the device 132, and the network relay 134 in the third base 130 belong to a domain different from the domain described above in which the device 132 performs time synchronization as the PTP master. Furthermore, although the "domain" is also defined in IEEE 1588 standard, in the present description, the "domain" is an identifier indicating a set including a plurality of devices that performs time synchronization and interacts with each other by using PTP.

B. Problem and Solution Regarding Synchronization Characteristics

A delay jitter occurs when a packet is transferred on a network. By using the BC function of the PTP compatible device, a network jitter can be removed. For example, the BC function is implemented in the network relay. However, since the synchronization performance of the synchronization circuit of the network relay is generally optimized on the premise of direct connection with a cable, it is often not possible to perform time synchronization with the grand master as the PTP slave in a case where the network environment is poor or in a case where synchronization characteristics of the devices are not suitable for the characteristics of the network line. Even if the BC function of the network relay is enabled, there arises a problem that a jitter of the network line cannot be removed and the devices of the entire time synchronization system cannot be time-synchronized.

Figure 2:
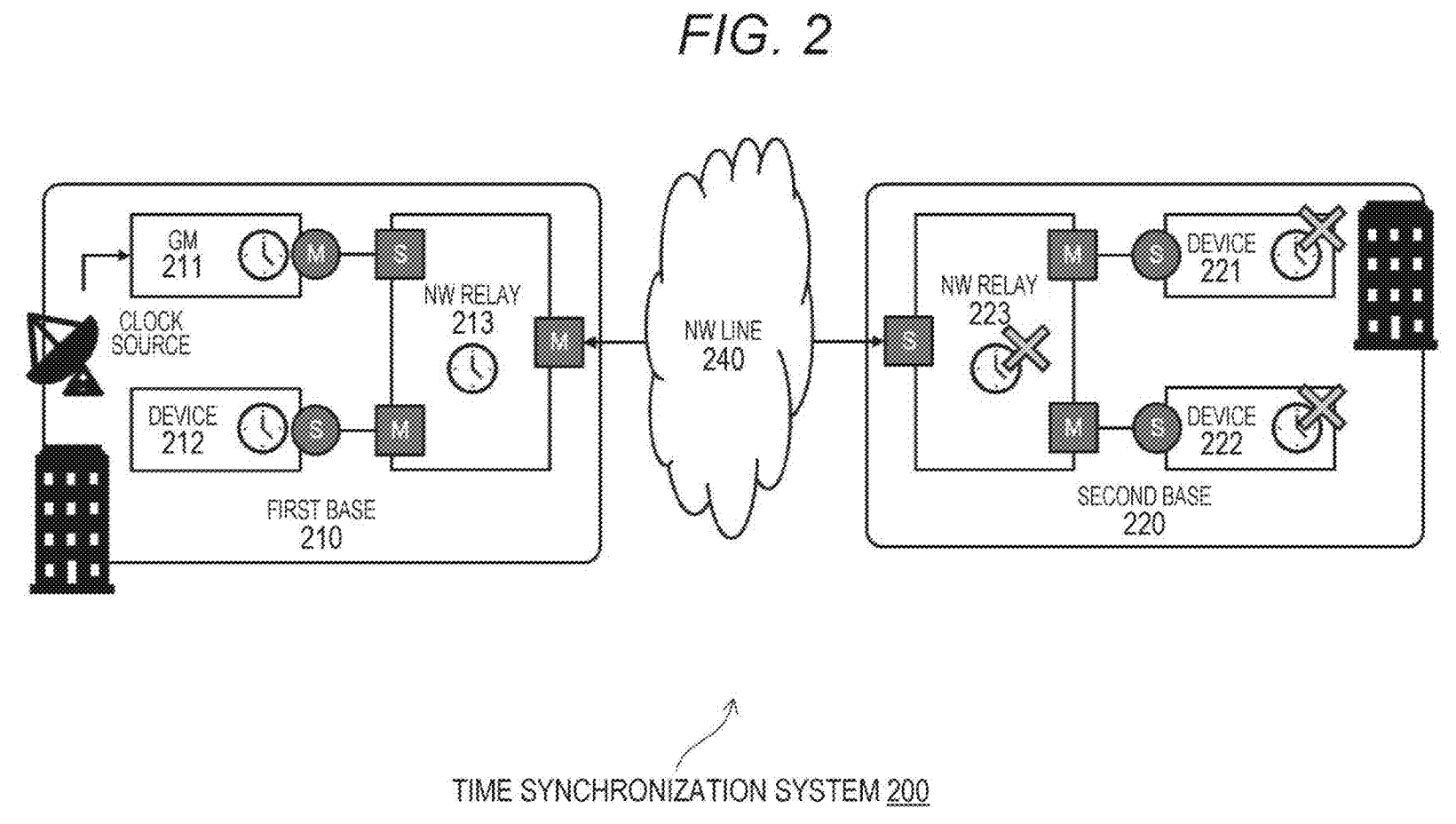

This problem will be discussed with reference to a time synchronization system 200 illustrated in FIG. 2. The illustrated time synchronization system 200 includes two sites of a first base 210 that is a GM base and a second base 220 that is a non-GM base. The first base 210 includes a grand master 211, a device 212, and a network relay 213. Furthermore, the second base 220 includes a device 221, a device 222, and a network relay 223. The sites are connected by a wide area network line 240.

Time synchronization in the first base 210 that is a GM base is achieved by a procedure similar to that of the time synchronization system 100 described above. Here, synchronization characteristics of the network relay 223 on the second base 220 side are not suitable for the characteristics of the wide area network line 240, the network relay 223 cannot perform time synchronization with the network device 213 in the GM base 210 as a PTP slave. Therefore, even if the BC function of the network relay 223 is enabled, the jitter of the wide area network line 240 cannot be removed, and thus the devices of the entire time synchronization system 200 cannot be synchronized. In FIG. 2, a "x" mark is attached to a device that cannot perform time synchronization.

It is desirable to enable the BC function of the PTP compatible device having network environment resistance, which can easily perform time synchronization even with the provided wide area network line 240. Regarding the index indicating the network environment resistance of the PTP compatible device, there is no definition in IEEE 1588 v2 or SMPTE 2059-2. Furthermore, the index indicating network environment resistance is not described in a catalog as a product specification of the PTP compatible device.

Thus, it is difficult to select an optimal PTP compatible device on the basis of the characteristic with respect to the network line quality.

Accordingly, in the present disclosure, index data representing network environment resistance (also referred to as the "network environment resistance index information" in the present description) among the synchronization performance in the PTP compatible device, and an evaluator and an evaluation method for deriving the index are defined. The network environment resistance index information according to the present disclosure is characteristic information that is not defined by technical standards related to time synchronization such as IEEE 1588 v2 and SMPTE 2059-2, and is not a product specification described in a product catalog.

Specifically, a management device that manages the network environment resistance index information of each PTP compatible device having the BC function in association with each PTP compatible device is installed in the time synchronization system. Among the respective sites constituting the time synchronization system, while time synchronization is possible in a site (GM base) where the grand master exists, in a site (a non-GM base) where the grand master does not exist, highly accurate time synchronization may not be achieved via a device (for example, a network relay) that does not have sufficient network environment resistance index information for a provided network line. On the other hand, in the present disclosure, a PTP compatible device having sufficient network environment resistance index information for a provided network line is selected as a device that performs time synchronization with a device in a time-synchronized network line such as a GM base on the basis of the network environment resistance index information of each PTP compatible device in the site (in particular, the non-GM base) managed by the management device. In this manner, according to the present disclosure, devices in each site that is a non-GM base can perform time synchronization with devices in the GM base, and the time synchronization of the devices of the entire time synchronization system can be achieved.

Furthermore, according to the present disclosure, in a site (for example, a non-GM base), in a case where a certain PTP compatible device is selected as a device that performs time synchronization with a PTP compatible device of a GM base on the basis of the network environment resistance index information, the BC function corresponding to two ports to be PTP paths is determined to be turned off among a plurality of ports of the network relay with the BC function (for example, the network relay 134 in the non-GM base 130 of the time synchronization system 100) passed through the PTP path connecting the selected device and the GM base. Thus, the device (for example, the device 133 in the non-GM base 130 of the time synchronization system 100) selected as the PTP master in the non-GM base can perform time synchronization with the device (for example, the network relay 113) in the GM base. Note that, in the present description, a PTP path means a path for performing time synchronization, and by connecting one device (PTP slave) to the other device (PTP master (including the grand master)) through the PTP path, the one device can perform time synchronization with the other device.

Furthermore, according to the present disclosure, it is possible to perform time synchronization with the site PTP master by being directly connected to the site PTP master in the same site that performs time synchronization with the grand master in a site (for example, a non-GM base), and it is possible to determine a device (for example, the device 132 in the non-GM base 130 of the time synchronization system 100) in the non-GM base as the PTP master (in another domain) in the same site.

Furthermore, according to the present disclosure, in a site (for example, a non-GM base), a PTP path connecting a PTP master and a PTP slave can be determined on the basis of the network environment resistance index information of each PTP compatible device having the BC function. For example, in the non-GM base 130 of the time synchronization system 100, a PTP path connecting the device 132 to be a PTP master and the device 131 to be a PTP slave is determined on the basis of the network environment resistance index information of each device.

Furthermore, according to the present disclosure, in a site (for example, a non-GM base), on/off of the BC function corresponding to two ports of the PTP path can be determined among the plurality of ports included in the network relay (for example, the network relay 134 in the non-GM base 130 of the time synchronization system 100) having the BC function and existing in the PTP path on the basis of the network environment resistance index information of each PTP compatible device having the BC function.

Furthermore, according to the present disclosure, a PTP domain of the network relay and a predetermined device existing in the PTP path among respective devices in the non-GM base can be determined on the basis of the PTP path.

As described above, according to the present disclosure, it is possible to enable the BC function of each PTP compatible device having the BC function and select the PTP master in the non-GM base on the basis of the network environment resistance index information of each PTP compatible device in a site (for example, a non-GM base). When the system configuration of the provided network line changes, the PTP master in the non-GM base is determined again. The change in the system configuration includes a change in the network environment, a change in the network environment resistance index information of at least a part of PTP compatible devices in the non-GM base, replacement of the devices in the non-GM base, increase of the devices, and removal of some devices.

The selection of the PTP master in a site (for example, a non-GM base) based on the network environment resistance index information according to the present disclosure is performed when the site is activated.

Furthermore, according to the present disclosure, in a case where a failure occurs in at least one of a plurality of PTP compatible devices having the BC function and existing in a site (for example, a non-GM base), the PTP master in the non-GM base can be selected on the basis of the network environment resistance index information of each of the remaining PTP compatible devices having the BC function in which no failure has occurred.

According to the present disclosure, it is possible to determine whether or not each PTP compatible device having the BC function is a device capable of performing time synchronization with predetermined or higher accuracy on the basis of the network environment resistance index information of each PTP compatible device having the BC function and the information indicating the network environment.

C. Evaluation of Network Environment Resistance Index Information

Figure 3:
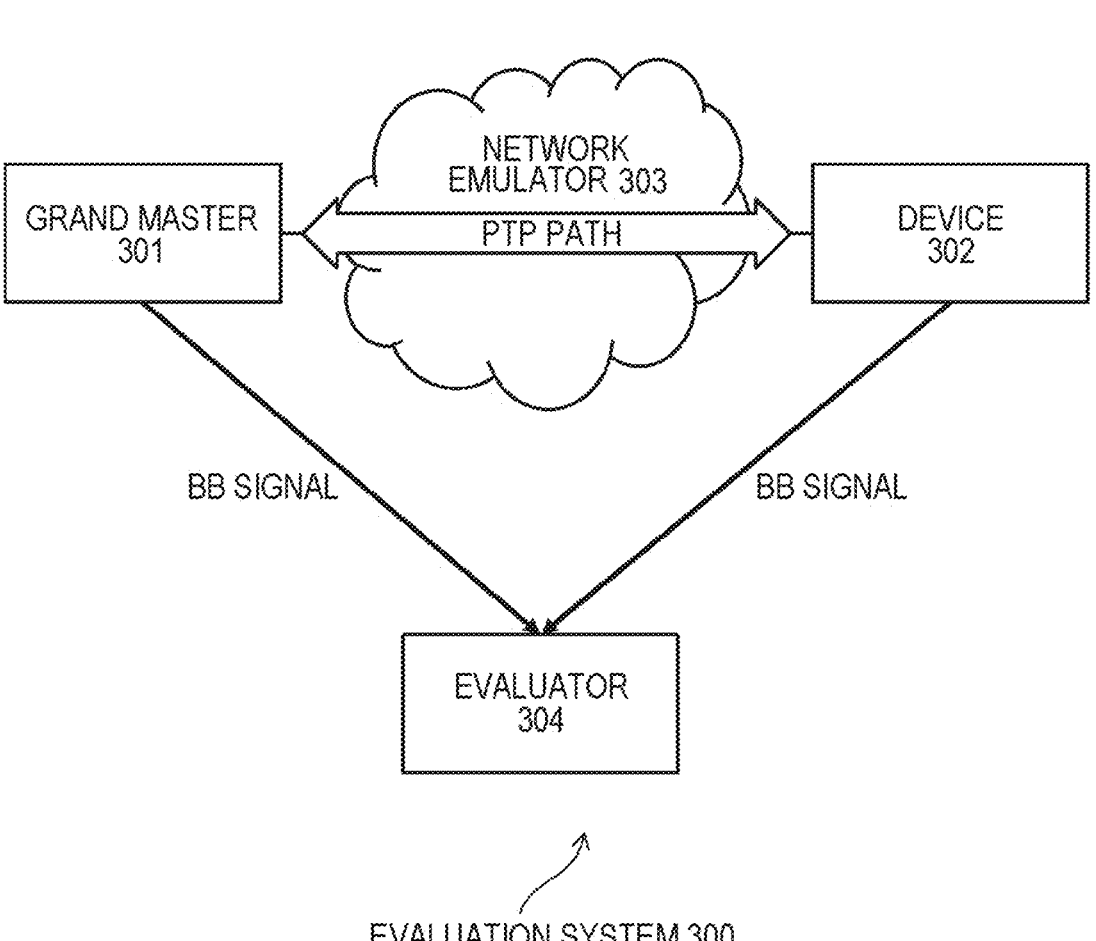
FIG. 3 is a diagram illustrating a configuration example of an evaluation system 300.

FIG. 3 schematically illustrates a configuration example of an evaluation system 300 that measures the network environment resistance index information of a device. The illustrated evaluation system 300 includes a grand master 301 and a measurement target device 302 disposed across a network emulator 303, and an evaluator 304 that evaluates the network environment resistance index information of the device 302.

The device 302 as an evaluation target is assumed to be the PTP compatible device having the BC function. The network emulator 303 is a device that emulates (reproduces) a network environment of a network line that is assumed to be provided in a time synchronization system in which the device 302 is actually used. When packet transfer is performed by the grand master 301 and the device 302, the network emulator 303 imparts a network load such as a network jitter or a packet loss rate, and reproduces a network environment of an actually provided network line.

A synchronization signal is transferred between the grand master 301 and the device 302 via a PTP path on the network emulator 303. Then, the evaluator 304 measures a phase difference, a frequency shift, and the like of the synchronization signal on the device 302 side with respect to the synchronization signal transmitted from the grand master 301 using, for example, an oscilloscope. In the example illustrated in FIG. 3, the evaluator 304 compares black burst (BB) signals from the grand master 301 and the device 302 to measure the phase difference and the frequency shift. The strength of the network load in which the phase difference or the frequency deviation that can be observed by the evaluator 304 is within the allowable value defined in SMPTE 2059-2 is defined as the network environment resistance index information.

That is, the network environment resistance index information in the present disclosure can be defined as information indicating the accuracy of time synchronization of the PTP compatible device having the BC function corresponding to the network environment, or network environment information indicating the network environment in a case where the accuracy of time synchronization of the PTP compatible device having the BC function is equal to or higher than a predetermined value.

The network environment information includes network load information indicating the strength of the network load related to time synchronization of the PTP compatible device having the BC function. The strength of the network load is a value defined on the basis of values such as the magnitude of delay distribution such as a jitter and packet loss defined by a general network tester, and the ratio of the packet loss rate (burst loss, random loss, or the like). That is, packet load information is information defined on the basis of at least one of packet transfer jitter information or packet transfer delay information. In a case where the packet load information is defined on the basis of both the packet transfer jitter information and the packet transfer delay information, the network environment resistance index information is defined according to the following Expression (1) so that the packet transfer jitter information has a higher contribution rate than the packet transfer delay information.

[Expression 1]

[Network environment resistance index information]= $\alpha \times$[packet transfer jitter]+$\beta \times$[packet transfer delay]　　　(1)

Here, $\alpha > \beta$

In the above Expression (1), $\alpha > \beta$ represents that the packet transfer jitter information has a higher contribution rate than the packet transfer delay information. Supplemental description will be made on the contribution rates of the packet transfer jitter and the packet transfer delay. In particular, in a case where the delay in a transfer direction from the PTP master to the PTP slave is different from the delay in a transfer direction from the PTP slave to the PTP master, the contribution rate of the packet transfer jitter information in the network environment resistance index information of the PTP compatible device increases. Furthermore, a component of an absolute delay amount in the packet transfer delay is canceled by authority of the PTP, and thus it is not taken into consideration much in the network environment resistance index information.

Note that, in this technical field, the packet transfer jitter may be expressed as "±5 milliseconds" or may be expressed by distribution. Therefore, the packet transfer jitter may be handled as data indicating the packet transfer jitter width (for example, if ±5 milliseconds, the packet transfer jitter width is 10 milliseconds). In addition, a round trip time (RTT) may be used for the packet transfer delay.

Furthermore, the network environment information may include information indicating the number of hops (the number of devices that need to pass through the PTP path) from the target PTP compatible device to the grand master. A point of setting the time synchronization system on the basis of the network environment resistance index information in consideration of the number of hops will be described in Section G below.

In the present disclosure, a management device manages the network environment resistance index information measured for each PTP compatible device having the BC function included in the time synchronization system in association with the PTP compatible device. The management device may acquire the network environment resistance index information measured for each PTP compatible device from the evaluator 304, but the management device may be equipped with the evaluator 304.

D. Selection and Time Synchronization of PTP Slave Based on Network Environment Resistance Index Information In this section, a procedure of selecting a PTP slave and a procedure of performing time synchronization using the network environment resistance index information according to the present disclosure will be described.

Figure 4A:
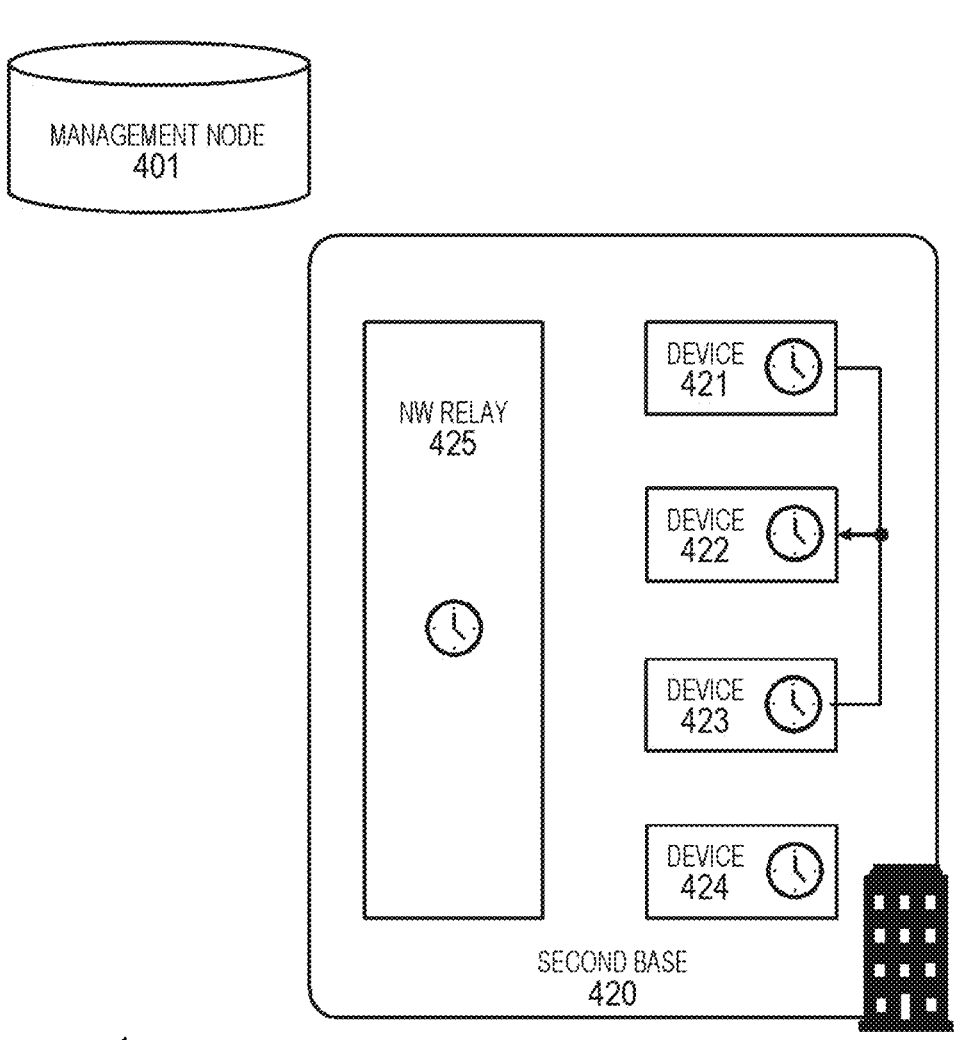
FIG. 4A is a diagram illustrating a configuration example of a time synchronization system 400.

FIG. 4A schematically illustrates a configuration example of a time synchronization system 400 including the management node 401. However, in FIG. 4A, in order to simplify the drawing, only a base 420 that is a non-GM base not having a grand master is drawn, and a GM base having a grand master and a network line (or provided on the base 420) sandwiched between the GM base and the base 420 are not illustrated.

The management node 401 corresponds to the "management device" described above, and manages the network environment resistance index information for the provided network line of each PTP compatible device having the BC function and existing in the time synchronization system 400 in association with the PTP compatible device. Furthermore, the management node 401 determines on/off of the BC function corresponding to the port of each PTP compatible device having the BC function and selects a site PTP master in the site. The location of the management node 401 is not limited as long as it is a place where Internet Protocol (IP) access to each device of the time synchronization system 400 can be performed. For example, the management node 401 may be installed in any site in the time synchronization system 400.

The base 420 includes four devices 421 to 424 and a network relay 425 connected to another site (not illustrated in FIG. 4A) via a provided network line (not illustrated in FIG. 4A). Each of the devices 421 to 423 and the network relay 425 is a PTP compatible device having the BC function, and is a target for evaluating the network environment resistance index information. The devices 421 to 423 having the BC function are desirably time synchronization devices that are connected through the external analog interface and perform time synchronization. On the other hand, the device 424 is a PTP compatible device not having the BC function, and is not evaluated for the network environment resistance index information. Although depending on the application field of the time synchronization system 400, many of devices such as a broadcasting device and a server correspond to PTP compatible devices not having the BC function. The number of PTP compatible devices not having the BC function is the largest. Furthermore, it is also assumed that the device 424 is not a time synchronization device.

FIG. 4B illustrates a state in which the management node 401 manages the network environment resistance index information of each device in association with the device. The location of the evaluator (not illustrated in FIG. 4B) is not limited as long as it can measure the network environment resistance index information of each device in the time synchronization system 400. For example, the functions of the evaluator in the management node 401 may be implemented.

In FIG. 4B, the evaluator measures the network environment resistance index information by reproducing a provided network line (not illustrated in FIG. 4) by the network emulator for each of the devices 421 to 423 and the network relay 425 as evaluation targets for the network environment resistance index information. Details of the measurement method have already been described in the section C described above, and thus will be omitted here. The evaluator outputs the measured network environment resistance index information of each device 421 to 423 and the network relay 425 to the management node 401. Then, the management node 401 manages the network environment resistance index information of each device 421 to 423 acquired from the evaluator in association with each device 421 to 423 and the network relay 425. The function of the management node 401 can be achieved, for example, in a form in which an information processing apparatus such as a computer executes a predetermined computer program.

The network environment resistance index information is as described in detail in section C described above. A method of expressing the network environment resistance index information is arbitrary. Hereinafter, in order to simplify the description, it is assumed that the network environment resistance index information is expressed by three types of index values of "L (Low)", "M (Middle)", and "H (High)".

In the time synchronization system 400, evaluation results of the network environment resistance index information of M, M, H, and L are measured for the device 421, the device 422, the device 423, and the network relay 425, respectively. The management node 401 manages the network environment resistance index information in association with each of the device 421, the device 422, and the device 423. Furthermore, the management node 401 selects a device to be a site PTP master by enabling the BC function in the base 420 on the basis of each device 421 to 423 that is the PTP compatible device having the BC function and the network environment resistance index information of the network relay 425. The site PTP master performs time synchronization as a PTP slave with respect to the device on the GM base side, and then provides the reference time in its own base. In the example illustrated in FIG. 4B, the device 423 whose network environment resistance index information indicates a highest index value "H" can be set as the site PTP master in the base 420.

Figure 5:
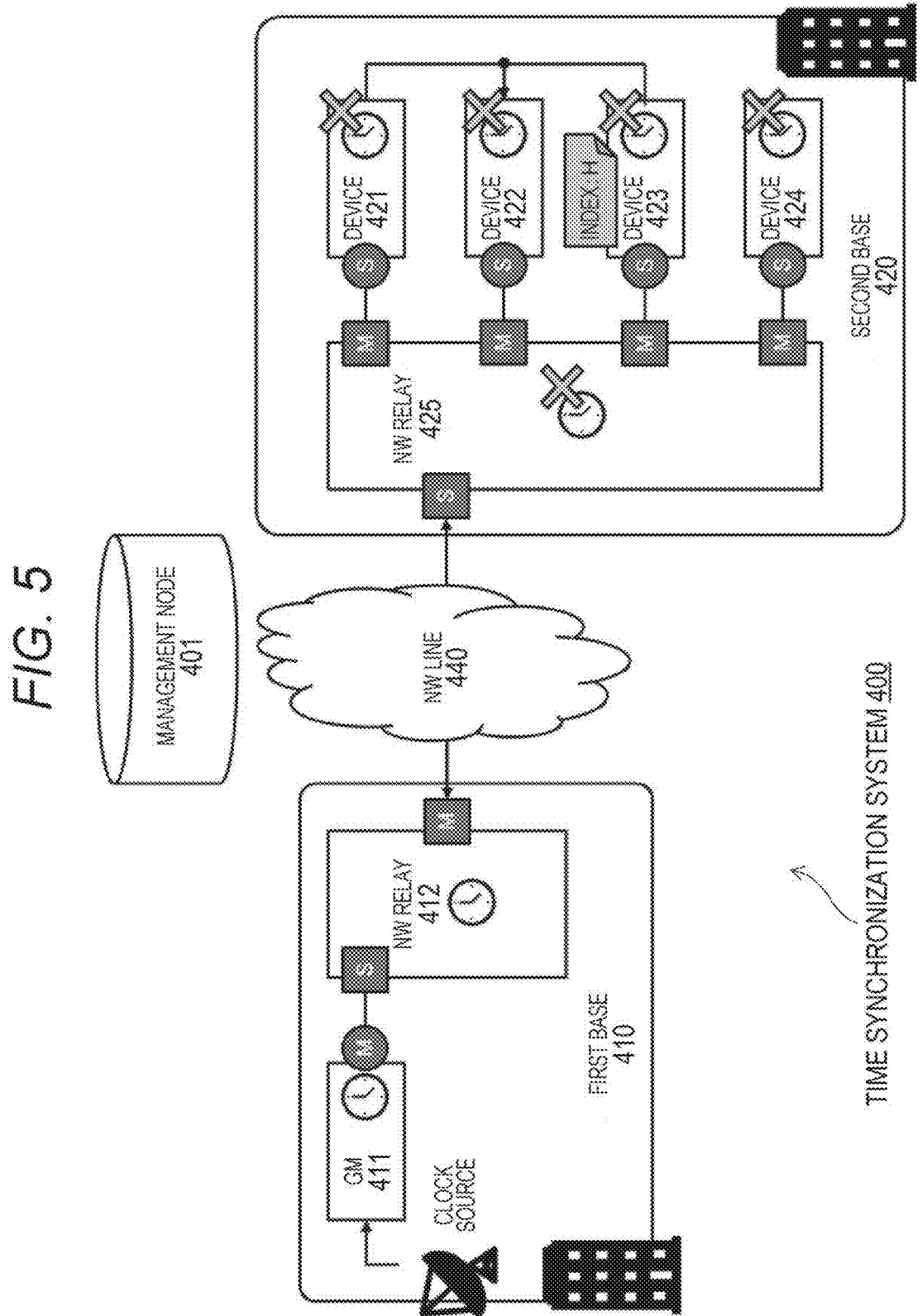
FIG. 5 is a diagram illustrating a configuration example (with an evaluation result of the network environment resistance index information) of the time synchronization system 400.

FIG. 5 illustrates an operation example of selecting a PTP slave and performing intra-site synchronization in the time synchronization system 400. However, in FIG. 5, a GM base 410 having a grand master and a network line 440 sandwiched between the GM base 410 and the base 420 are additionally illustrated. The GM base 410 includes a grand master 411 and a network relay 412.

Time synchronization in the GM base 410 is achieved by a procedure similar to that of the time synchronization system 100 described above. In the example illustrated in FIG. 5, on the base 420 side, the network relay 425 whose network environment resistance index information is "L" is selected as the site PTP master. Thus, the network relay 425 performs time synchronization as a PTP slave with respect to the network device 412 in the GM base 410, and operates as a PTP master with respect to the devices 421 to 424 in the base 420, and the devices 421 to 424 performs time synchronization with the network relay 425. However, even if the BC function of the network relay 425 is enabled, the jitter of the wide area network line 440 cannot be removed because the network environment resistance index is not sufficient, and the devices 421 to 424 cannot perform the time synchronization with the network device 412 in the GM base 410 with high accuracy. In FIG. 5, a "x" mark is attached to a device that cannot perform time synchronization.

Figure 6:
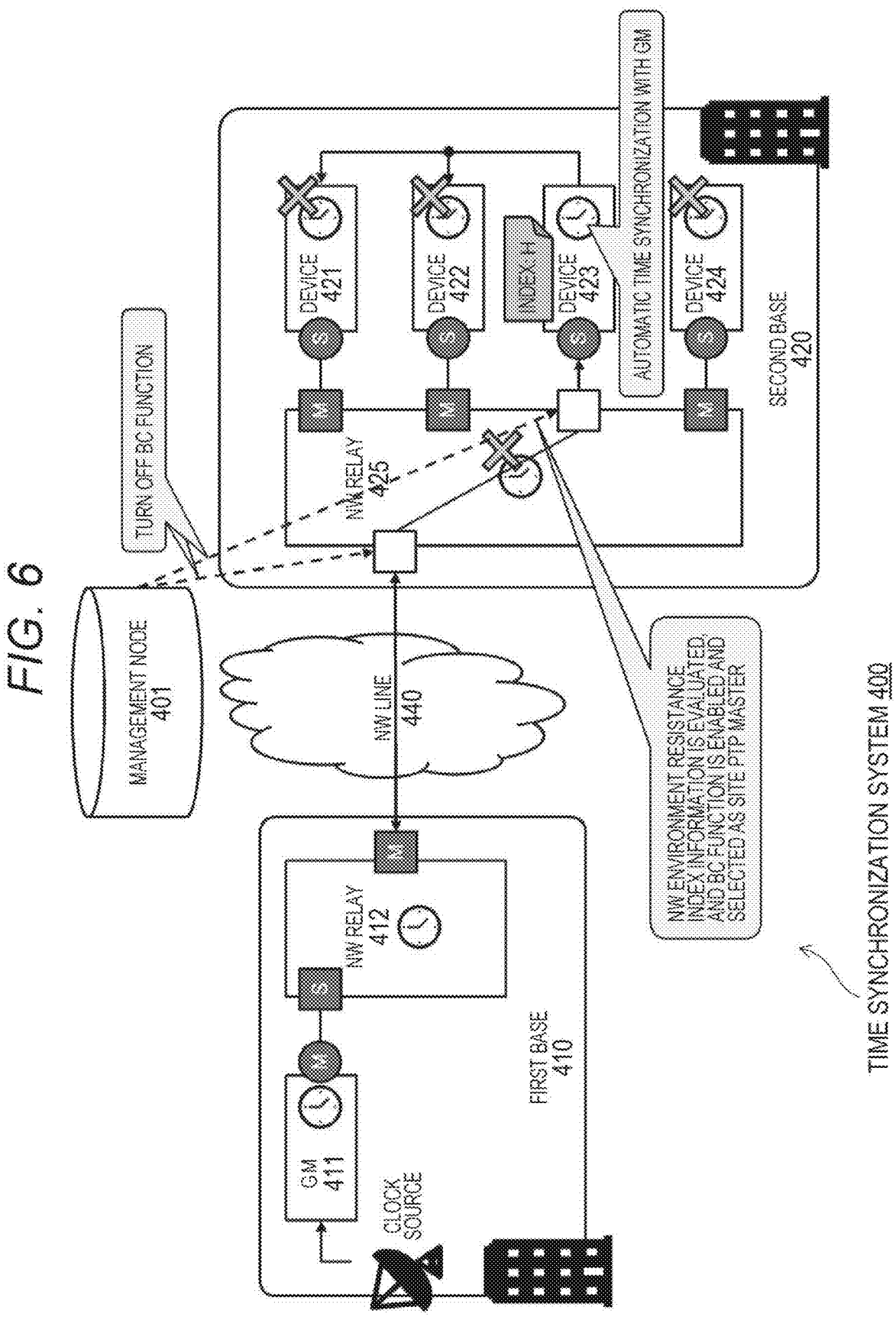
FIG. 6 is a diagram illustrating an operation example of the time synchronization system 400.

Accordingly, as illustrated in FIG. 6, the management node 401 selects the device 423 associated with the highest index value "H" of the network environment resistance index information in the base 420 as the site PTP master in the base 420, and enables the BC function of the device 423. Furthermore, the management node 401 turns off the BC function corresponding to two ports of the network relay 425 to be the PTP path connecting the device 423 and the GM base 410. In FIG. 6, the port of the network relay 425 with the BC function turned off is represented in a blank state in which neither "M" indicating that it operates as a PTP master with respect to the peer nor "S" indicating that it operates as a PTP slave with respect to the peer is written. Thus, the device 423 as a PTP slave can perform time synchronization with the network relay 412 on the GM base 410 side as a PTP master.

Figure 7:
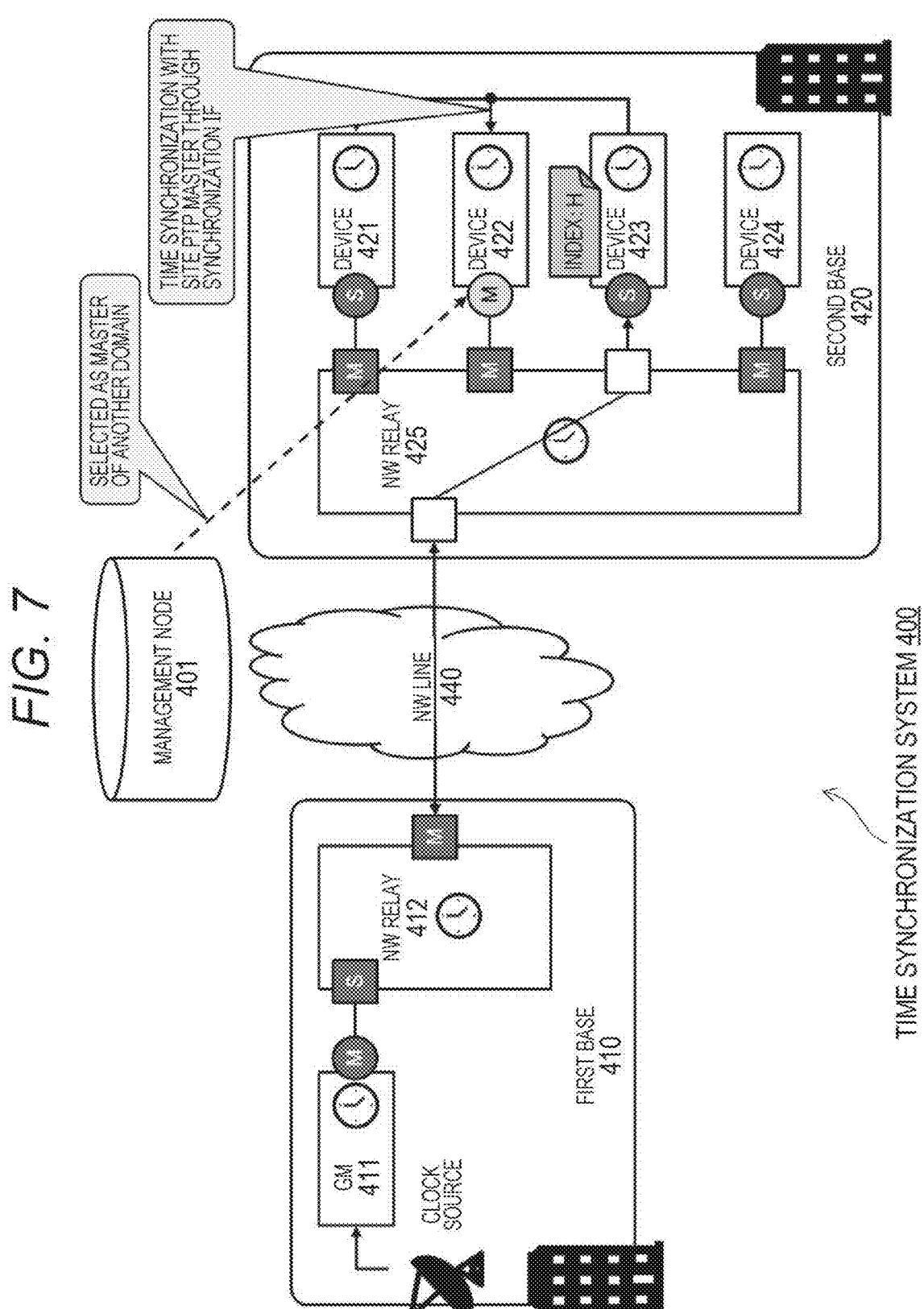
FIG. 7 is a diagram illustrating an operation example of the time synchronization system 400.

Subsequently, as illustrated in FIG. 7, the management node 401 selects the device 423 that is the site PTP master and the device 422 capable of time synchronization through the external analog interface as the PTP master of another domain (in FIG. 7, the ports are colored with different shades of gray for each time synchronization domain). This is because if the device 422 remains in the same domain as that of the GM base 410, the device 422 receives, as a PTP slave, the PTP packet from which the jitter is not removed from the GM base 410 and performs the time synchronization inaccurately. In this case, the device 422 gives priority to the time information using the PTP packet over the accurate time information acquired from the device 423 through the analog interface. Therefore, it is necessary to prevent the device 422 having the medium network environment resistance index information from directly performing the time synchronization with the network relay 412 in the GM base 410.

Figure 8:
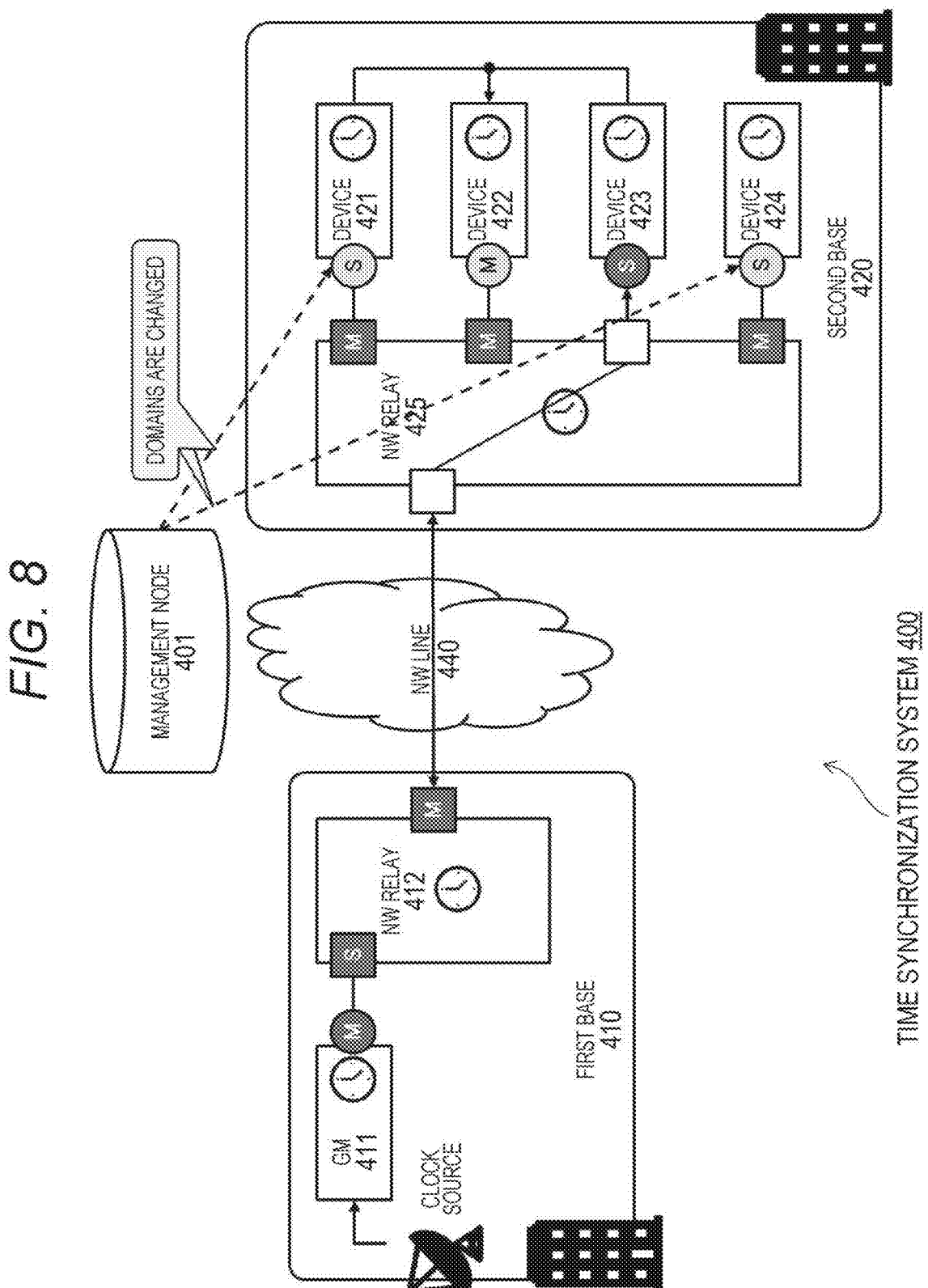
FIG. 8 is a diagram illustrating an operation example of the time synchronization system 400.

Subsequently, as illustrated in FIG. 8, the management node 401 changes the domains of the other devices 421 and 424 in the base 420 to the same domains as that of the device

422. Thus, it is possible to prevent the devices 421 and 424 from receiving the PTP packet from which the jitter is not removed from the network relay 412 in the GM base 410 and performing the time synchronization. It is necessary to prevent the devices 421 and 424 associated with the medium index value "M" of the network environment resistance index information from being directly time-synchronized with the network relay 412.

Figure 9:
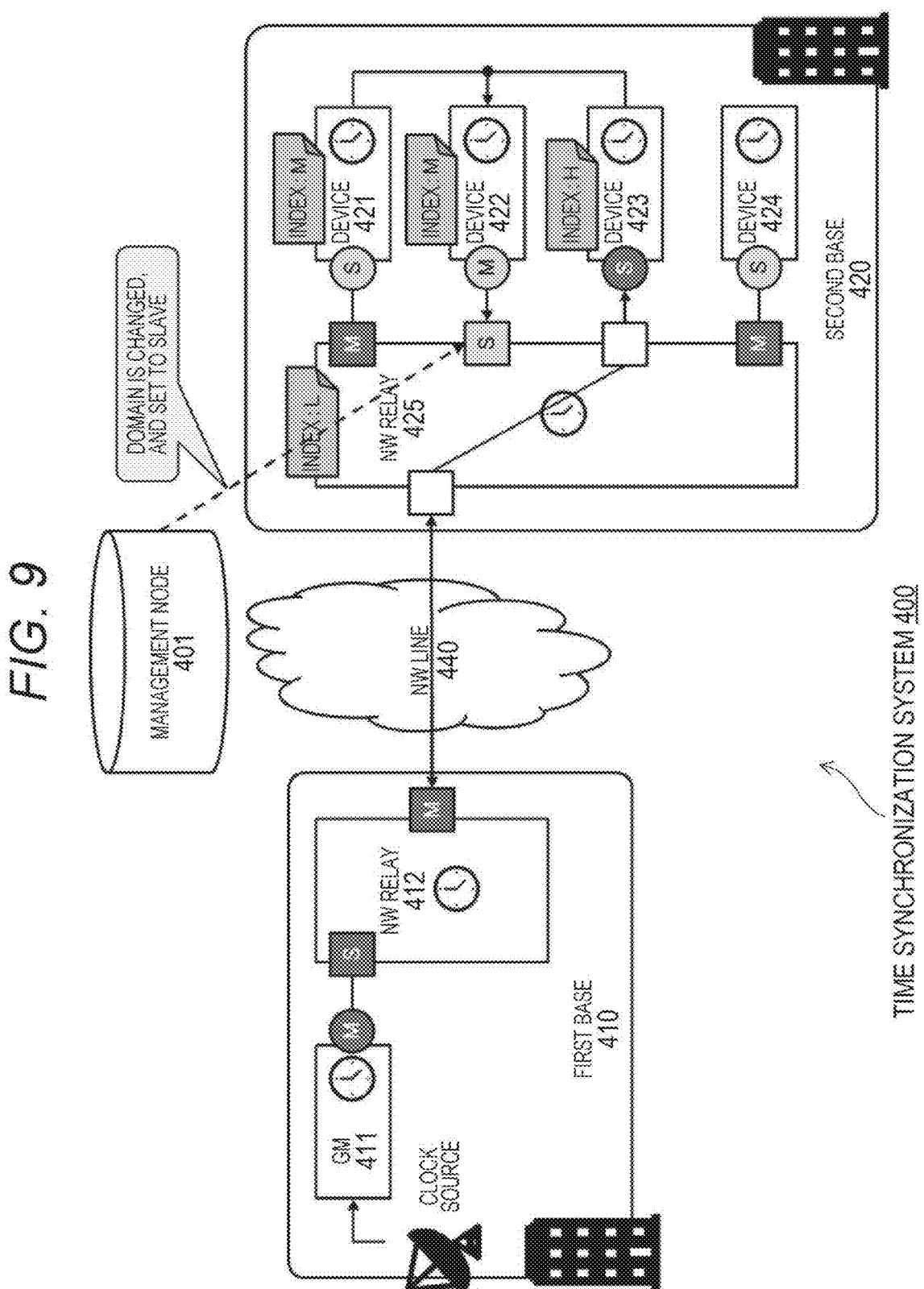
FIG. 9 is a diagram illustrating an operation example of the time synchronization system 400.

Subsequently, as illustrated in FIG. 9, the management node 401 changes the domain using the PTP path to which the device 422 after changing the domain is connected. That is, the network relay 425 switches to operate as a PTP slave to the device 422 (in the diagram, "S" indicating that it is a PTP slave is entered in the port connected to the device 422). Consequently, the network relay 425 can perform, as a PTP slave, time synchronization with the device 422 set as the site PTP master.

Figure 10:
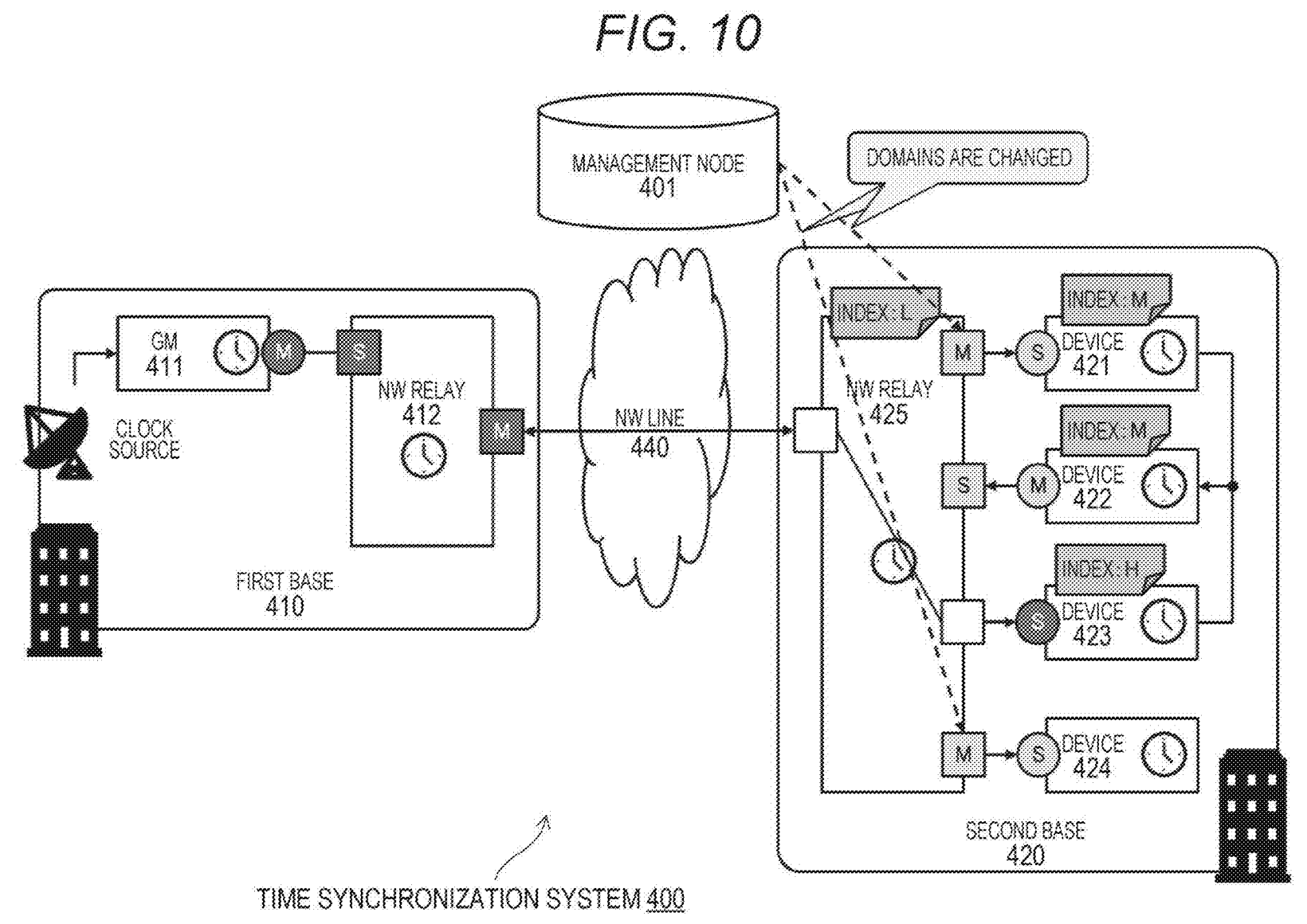

Subsequently, as illustrated in FIG. 10, the management node 401 changes the domain through the path to which the devices 421 and 424 after the domain change are connected. In the diagram, among the plurality of ports included in the network relay 425, the ports respectively connected to the devices 421 and 424 are colored in gray of the same shade to represent the same domain as that of the device 422. With this domain change, the devices 421 and 424 can perform time synchronization with the network relay 425 time-synchronized with the device 422 as PTP slaves.

Figure 11:
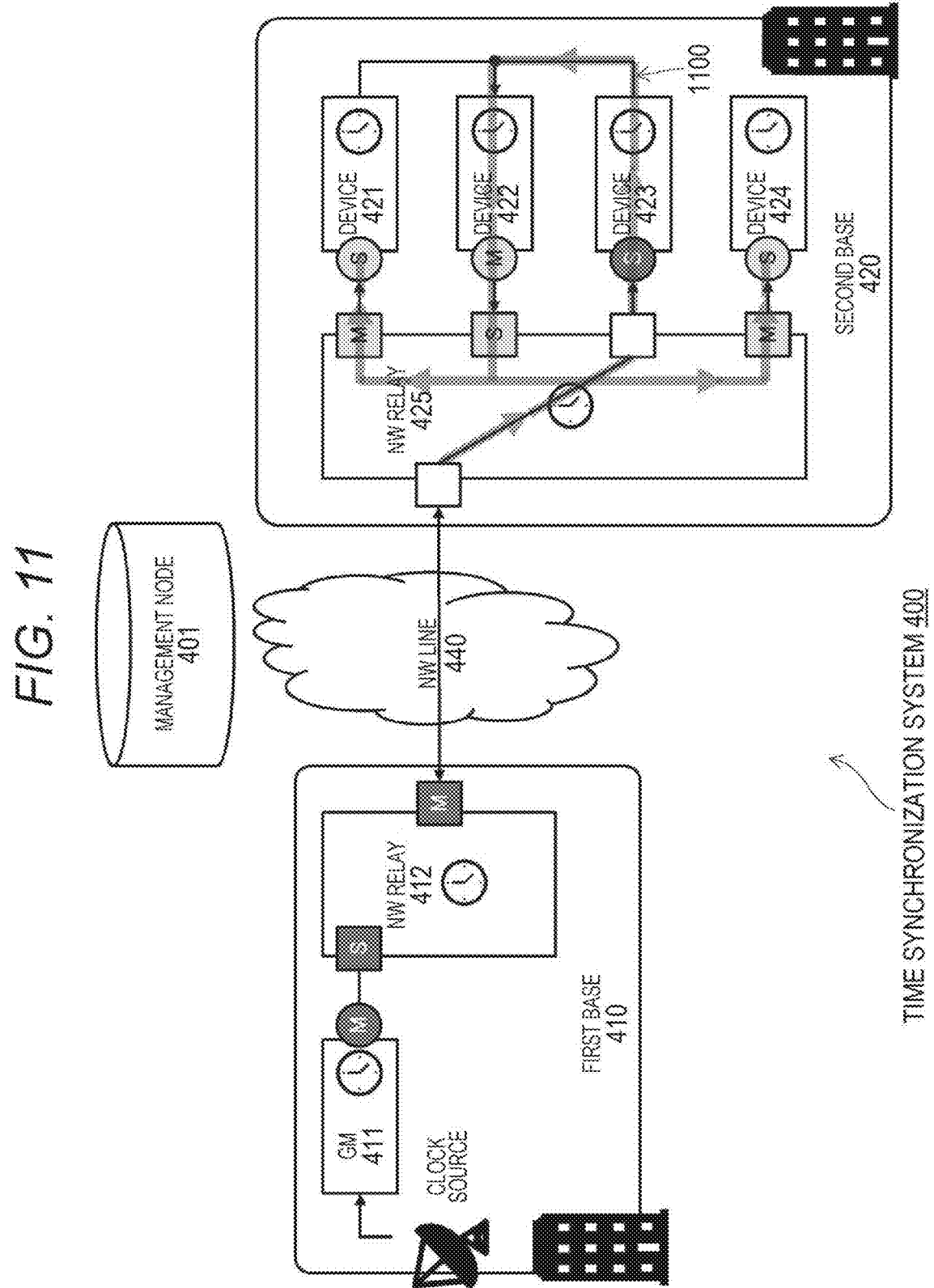
FIG. 11 is a diagram illustrating an operation example of the time synchronization system 400.

A result of performing on/off setting of the BC function and domain setting corresponding to the port of each device in the time synchronization system 400 through the operation procedure illustrated in FIGS. 5 to 10 is as illustrated in FIG. 11.

Referring to FIG. 11, in the non-GM base 420, the device 423 whose network environment resistance index information has the highest index value "H" belongs to the same domain as that of the GM base 410 and can perform time synchronization with the network device 412.

Furthermore, other devices in the non-GM base 420 whose network environment resistance index information has a medium or lower index value do not directly perform time synchronization with the PTP packet from which the jitter is not removed from the network relay 412 in the GM base 410. The device 422 can be connected to the device 423 through the external analog interface to perform time synchronization. Furthermore, the device 422 is selected as another PTP master in the non-GM base 420, and the PTP path 1100 connecting the PTP master and the PTP slave is determined in this another domain.

Referring to FIG. 11, the network relay 425 is set to operate as a PTP slave for the device 422 (in the diagram, "S" indicating that it is a PTP slave is entered in the port connected to the device 422), and thus the network relay 425 performs time synchronization with the device 422. Furthermore, the network relay 425 is set to operate as a PTP master for the device 421 and the device 425 (in the diagram, "M" indicating that it is a PTP master is entered in the ports connected to the device 421 and the device 425), and thus the device 421 and the device 425 perform time synchronization with the network relay 425.

In this manner, all devices 421 to 425 in the non-GM base 420 can synchronize with the reference time.

E. Dynamic Setting Change Process Upon Failure

According to the present disclosure, in a case where a failure occurs in a time synchronization system, the on/off setting of the BC function corresponding to each port of each PTP compatible device having the BC function, domain setting, and the like are dynamically changed, and time synchronization of the entire system can be maintained even after the failure occurs. For example, in a case where a failure occurs in at least one of a plurality of PTP compatible devices having the BC function and existing in the non-GM base, a PTP compatible device that performs time synchronization with a PTP compatible device of the GM base is reselected on the basis of the network environment resistance index information of each of the remaining PTP compatible devices having the BC function in which no failure has occurred.

A dynamic setting change process when a failure occurs will be described with a time synchronization system 1200 illustrated in FIG. 12 as an example. The illustrated time synchronization system 1200 includes two sites including a first base 1210 that is a GM base and a second base 1220 that is a non-GM base, and includes a management node 1201. The first base 1210 includes a grand master 1211 and a network relay 1212. Furthermore, the second base 1220 includes devices 1221 to 1224 and a network relay 1225. Furthermore, the sites are connected by a wide area network line 1240.

The management node 1201 corresponds to the "management device" described above, and manages the network environment resistance index information for the provided wide area network line 1240 of each PTP compatible device having the BC function and existing in the time synchronization system 1200 in association with the PTP compatible device, and performs determination of on/off of the BC function corresponding to each port of each PTP compatible device having the BC function, selection of the site PTP master in the site, and setting of the domain.

The devices 1221 to 1214 and the network relay 1225 in the second base 1220 are both PTP compatible devices, and the devices 1221 to 1223 and the network relay 1225 have the BC function, but the device 1224 does not have the BC function. Therefore, the devices 1221 to 1223 and the network relay 1225 are management targets of the network environment resistance index information by the management node 1201, but the device 1224 is not a management target.

Figure 12:
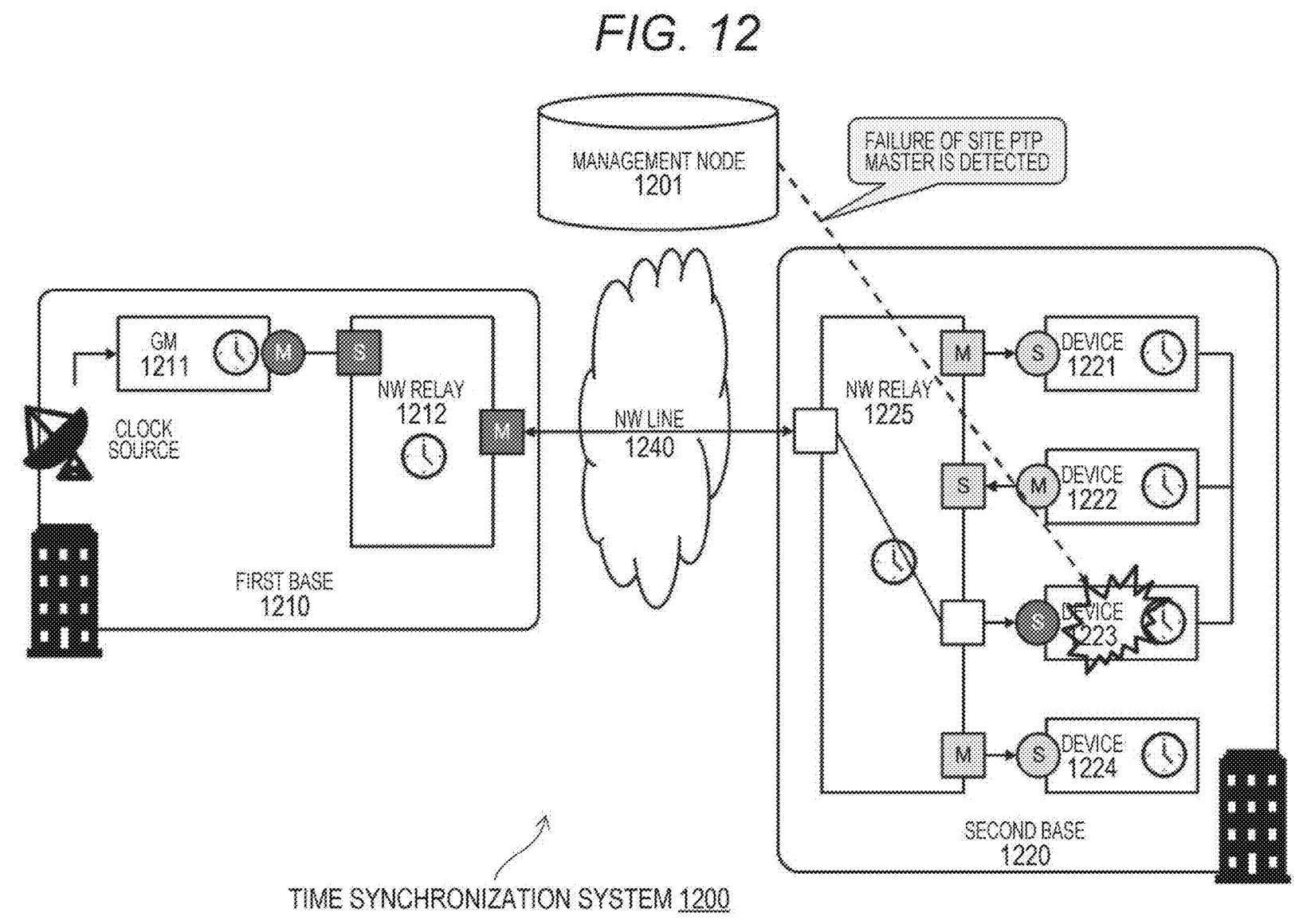

In the state illustrated in FIG. 12, the device 1223 is selected as the site PTP master of the second base 1220, belongs to the same domain as that of the GM base 1210, and is time-synchronized with the network device 1212 in the GM base 1210. Furthermore, other devices in the non-GM base 1220 are set in another domain different from that of the GM base 1210. In this another domain, the device 1222 is selected as the PTP master. Furthermore, the network relay 1225 is set to operate as a PTP slave for the device 1222 (in the diagram, "S" indicating that it is a PTP slave is entered in the port connected to the device 1222), and is set to operate as a PTP master for the device 1221 and the device 1225 (in the diagram, "M" indicating that it is a PTP master is entered in each of the device 1221 and the port connected to the device 1225).

The location of the management node 1201 is not limited as long as it is a place where IP access to each device of the time synchronization system 1200 can be performed. The management node 1201 can detect whether a failure has occurred in each device in the time synchronization system 1200 by IP communication check using a ping command or the like. In the example illustrated in FIG. 12, the management node 1201 detects a failure of the device 1223.

Figure 13:
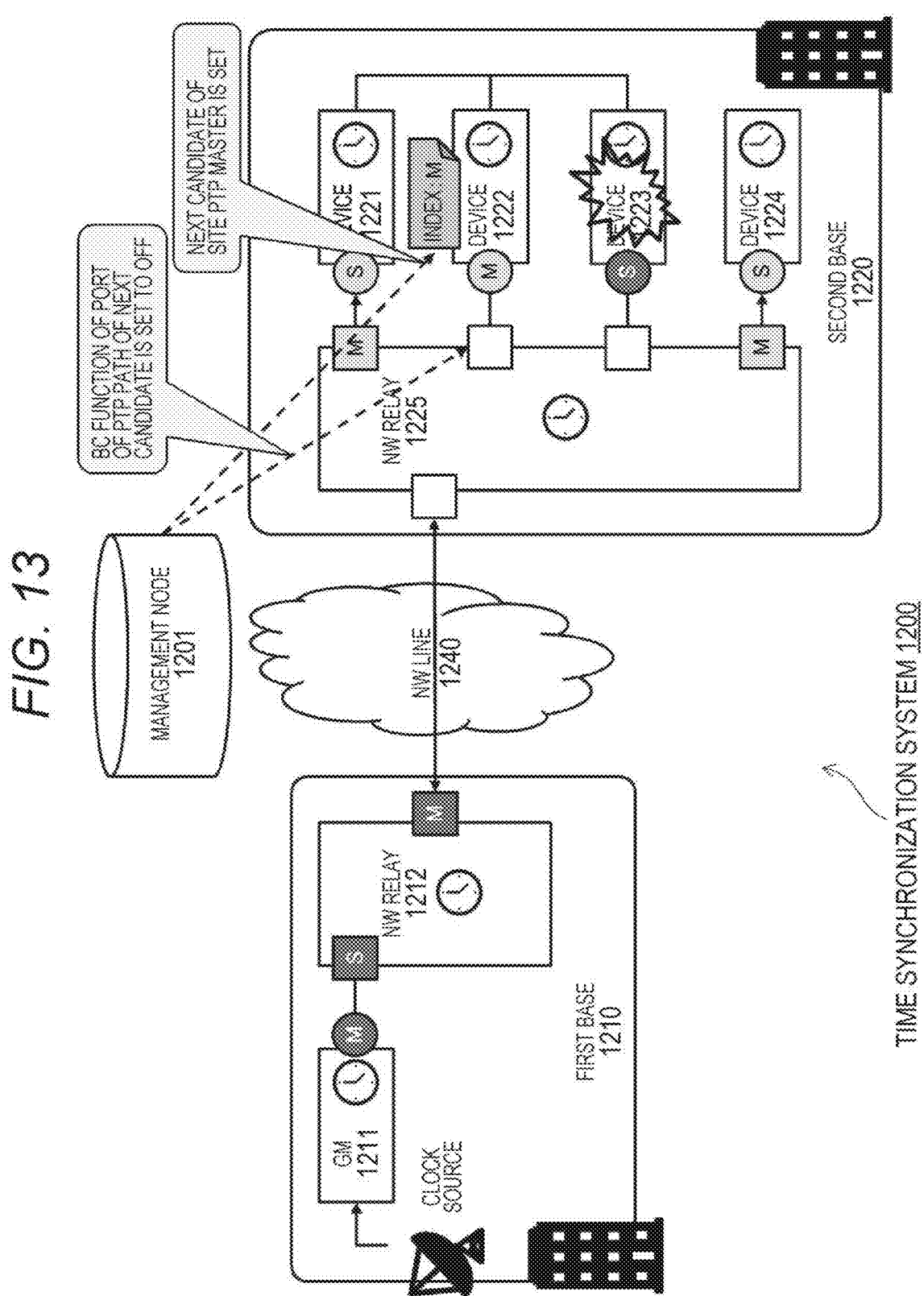
FIG. 13 is a diagram illustrating an operation of the time synchronization system 1200 when a failure occurs.

The device 1223 before the failure has been selected as the current site PTP master of the second base 1220, belongs to the same domain as that of the GM base 1210, and is time-synchronized with the network device 1212 in the GM base 1210. Accordingly, the management node 1201 compares the network environment resistance index information associated with each of the other devices 1221 and 1222 in which no failure has occurred and the network relay 1225, and selects the next candidate of the site PTP master. In the example illustrated in FIG. 13, the management node 1201 sets the device 1222 associated with the next highest index value "M" of the network environment resistance index information as the next candidate of the site PTP master. Then, the management node 1201 turns off the BC function corresponding to the port of the network relay 1225 that becomes the PTP path connecting the device 1222 that is the next candidate for the site PTP master and the GM base 1210.

Figure 14:
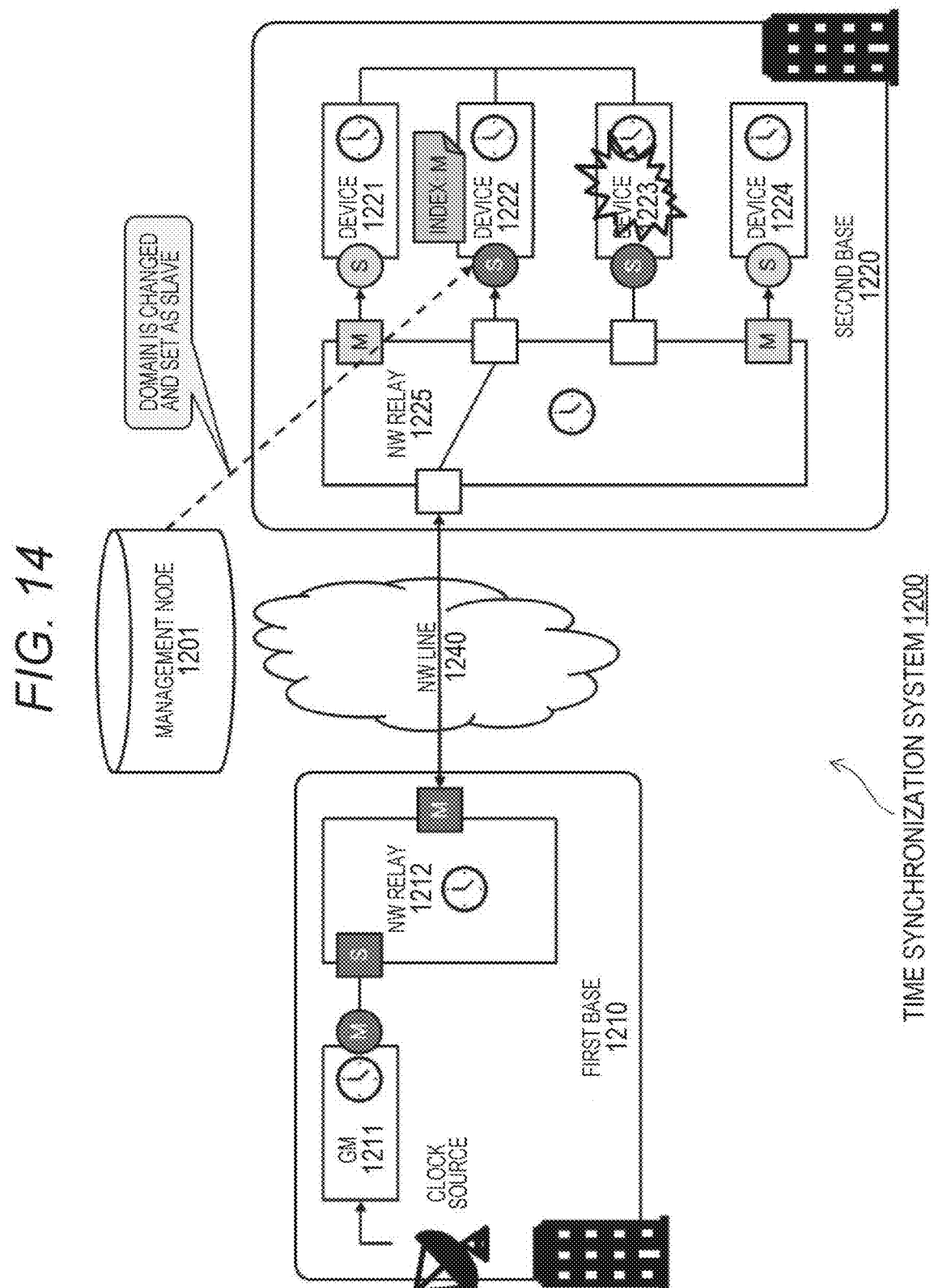
FIG. 14 is a diagram illustrating an operation of the time synchronization system 1200 when a failure occurs.

Next, as illustrated in FIG. 14, the management node 1201 changes the setting of the device 1222 to the PTP slave in the same domain as that of the GM base 1210. Thus, the device 1222 can perform time synchronization with the network device 1211 on the GM base 1210 side.

Figure 15:
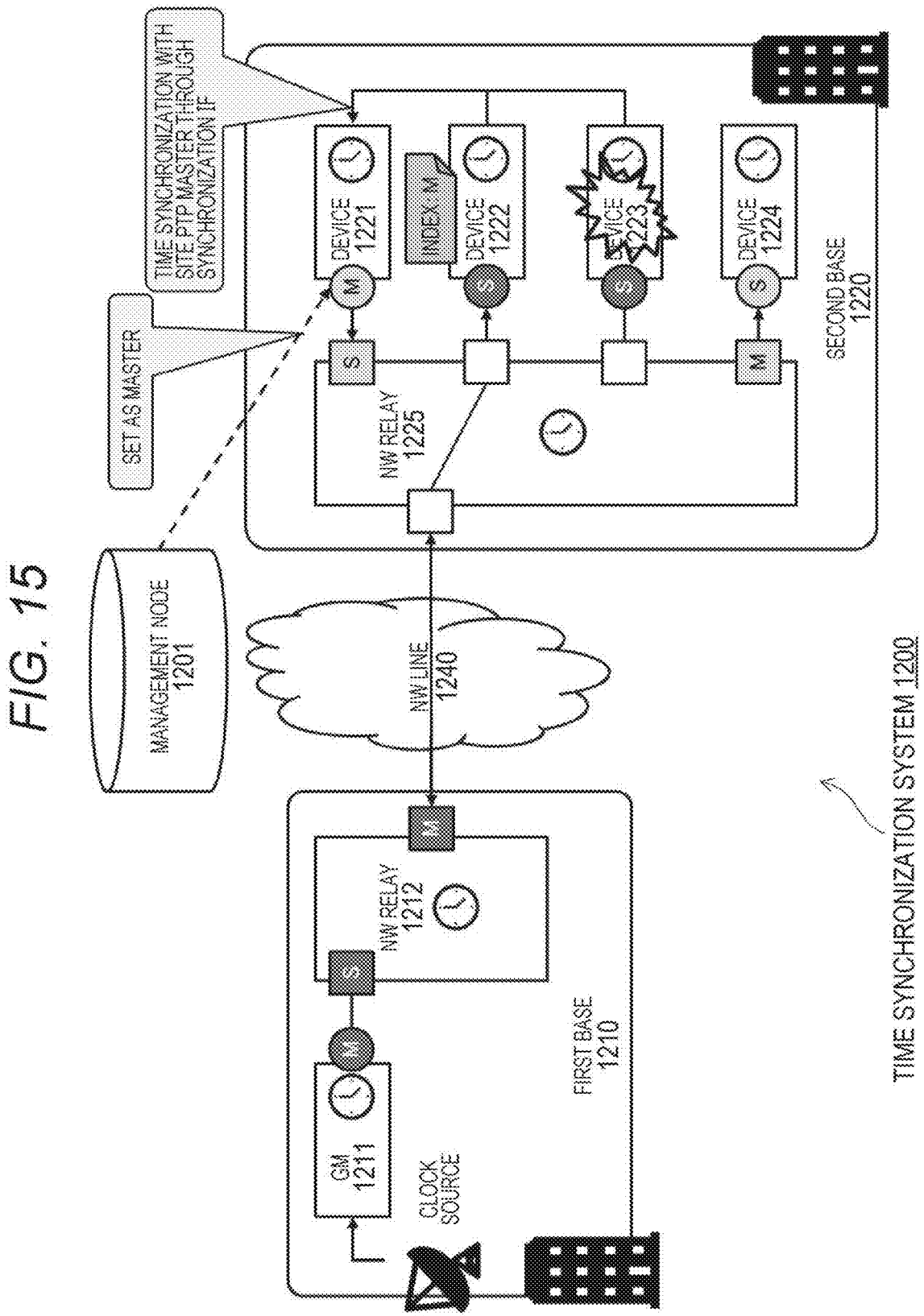
FIG. 15 is a diagram illustrating an operation of the time synchronization system 1200 when a failure occurs.

Next, as illustrated in FIG. 15, the management node 1201 sets again the device 1221 capable of time synchronization through an analog interface external to the device 1222 as the PTP master of another domain. By changing the domain, the device 1221 having the medium network environment resistance index information is prevented from receiving the PTP packet from which the jitter is not removed from the network relay 1212 in the GM base 1210 and performing the time synchronization. Furthermore, the network relay 1225 is set again to operate as a PTP slave for the device 1221 (in the diagram, the port connected to the device 1221 is changed from "M" to "S"). Consequently, the network relay 1225 can perform, as a PTP slave, time synchronization with the device 1222 set as the PTP master of another domain. Furthermore, the device 1224 can perform, as a PTP slave, time synchronization with the network relay 1225 time-synchronized with the device 1222.

Figure 16:
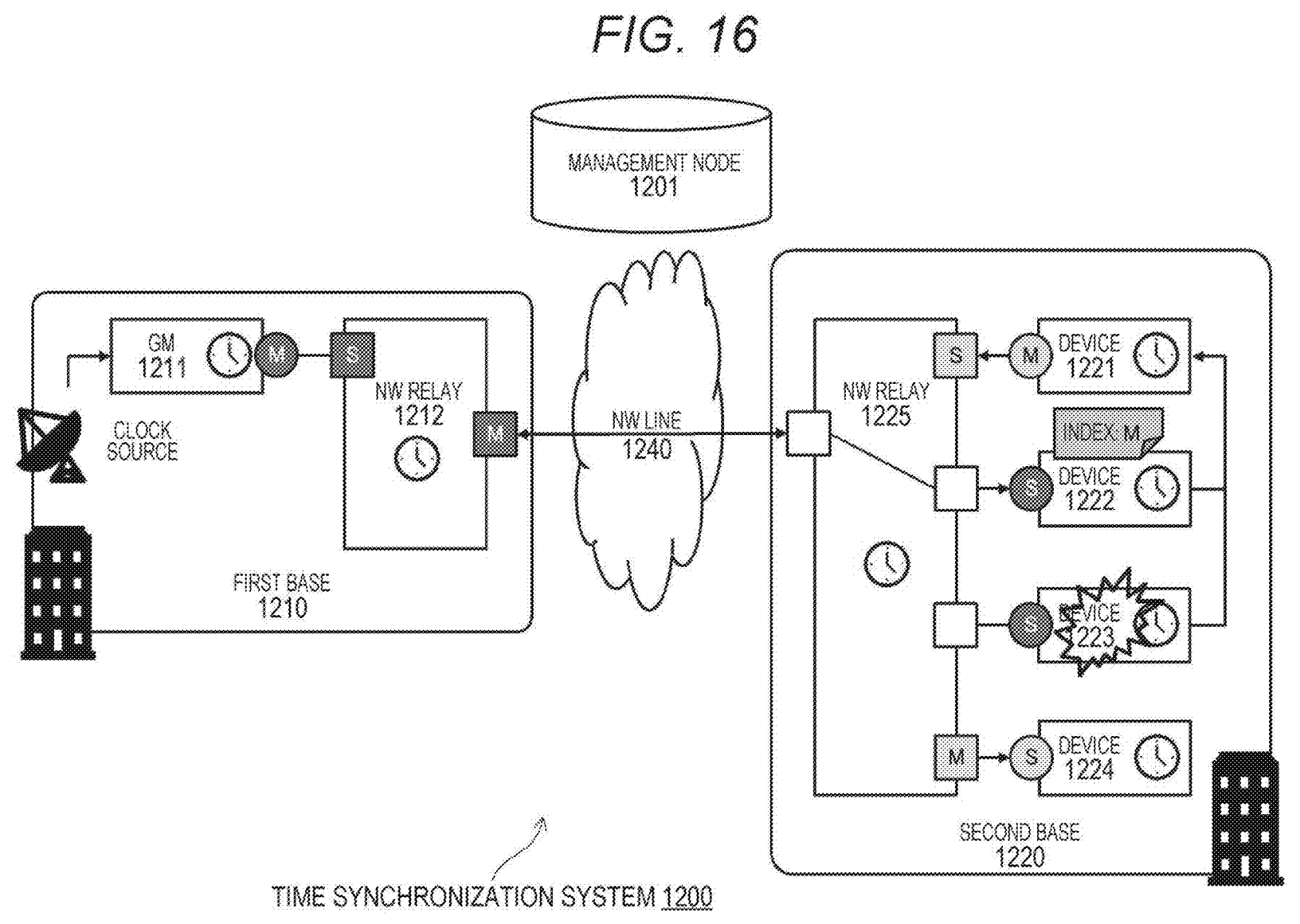

Through the operation procedure when a failure occurs as illustrated in FIGS. 12 to 15, on/off of the BC function and the domain corresponding to each port of each device in the time synchronization system 1200 are reset as illustrated in FIG. 16.

Referring to FIG. 16, in the non-GM base 1220, a device 1222 set as a new site PTP master on the basis of the associated network environment resistance index information can be changed to the same domain as that of the GM base 1210 and perform time synchronization with the network device 1212 in the GM base 1210. Further, the device 1221 can be connected to the device 1222 through the external analog interface to perform time synchronization. In addition, the device 1221 is reset to the PTP master of another domain in the non-GM base 1220, and the network relay 1225 performs time synchronization with the device 1221. Furthermore, the device 1225 performs time synchronization with the network relay 1225.

In this manner, in a case where a failure occurs in the device in the non-GM base 1220 (the device 1223 set as the site PTP master), each device in the non-GM base 1220 can synchronize with the reference time by resetting on/off of the BC function and the domain corresponding to each port of each device in the time synchronization system 1200.

F. Timing of Making Determination Using Network Environment Resistance Index Information According to the present disclosure, on the basis of the network environment resistance index information of each PTP compatible device in a site (for example, a non-GM base), the BC function of each PTP compatible device having the BC function in the time synchronization system is enabled, and dynamic setting such as selection of a PTP master in the non-GM base is performed. The dynamic setting using the network environment resistance index information is performed at various timings such as at the time of start of operation of the system (or when the system is started), at the time of change in the network environment, at the time of change in the system configuration, and at the time of change in the network environment resistance index information. The change in the system configuration includes a change in the network environment, a change in the network environment resistance index information of at least a part of PTP compatible devices in the non-GM base, replacement of the devices in the non-GM base, increase of the devices, and removal of some devices.

Hereinafter, a process of performing dynamic setting using the network environment resistance index information at each timing will be described using the time synchronization system 1200 illustrated in FIG. 12 as an example.

F-1. Dynamic Setting Process at Time of Start of System Operation

Figure 17:
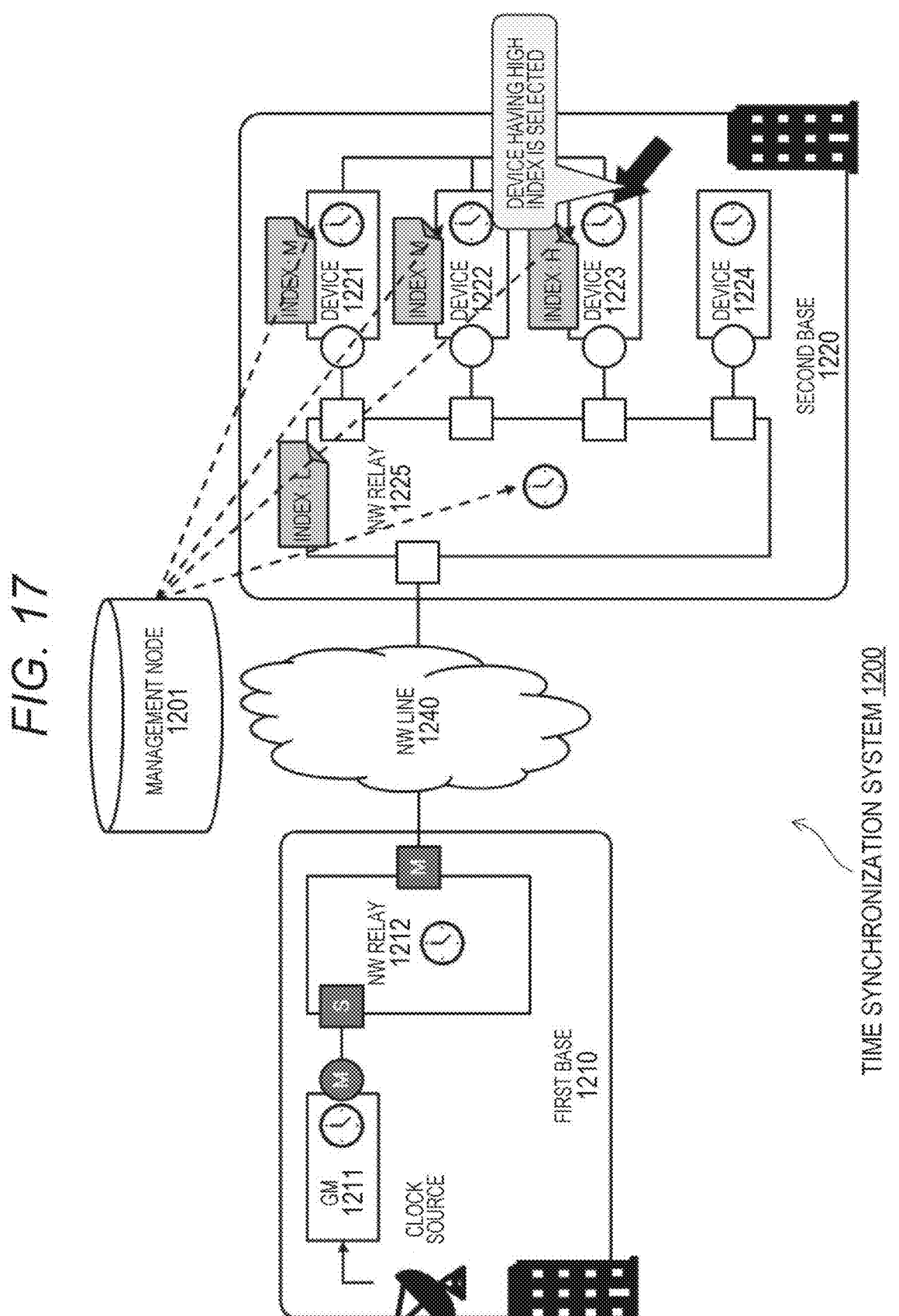
FIG. 17 is a diagram illustrating an operation dynamic setting process at a time of start of system operation of the time synchronization system 1200.

At the time of start of operation, for example, the devices 1221 to 1224 corresponding to use equipment such as a broadcasting device are brought into a studio corresponding to the second base 1220 that is a non-GM base, each connected to the network relay 1225, and prepared before the start of operation. FIG. 17 illustrates an operation example of the time synchronization system 1200 when use of the studio is started, that is, when operation of the second base 1220 is started.

In the time synchronization system 1200, the devices 1221 to 1223 and the network relay 1225 are PTP compatible devices having the BC function, but the device 1224 is a PTP compatible device not having the BC function. Therefore, the devices 1221 to 1223 and the network relay 1225 are management targets of the network environment resistance index information by the management node 1201, but the device 1224 is not a management target (as described above). Before the start of the system operation, all the BC functions corresponding to the ports of the respective devices in the second base 1220 are turned off, and the master/slave and the domain are not set.

An evaluator (not illustrated) reproduces the provided wide area network line 1240 for each of the devices 1221 to 1223 and the network relay 1225 as evaluation targets for the network environment resistance index information, and measures the network environment resistance index information. Details of the measurement method have already been described in the section C described above, and thus will be omitted here. In the example illustrated in FIG. 17, the network environment resistance index information of M, M, H, and L is measured for the device 1221, the device 1222, the device 1223, and the network relay 1225, respectively. The evaluator outputs the measured network environment resistance index information of each device 1221 to 1223 and the network relay 1225 to the management node 1201.

The management node 1201 manages the network environment resistance index information of each device 1221 to 1223 acquired from the evaluator in association with each device 1221 to 1223 and the network relay 1225. Then, when the use of the studio is started, that is, when the operation of the second base 1220 is started, the management node 1201 sets the device 1223 associated with the highest index value "H" of the network environment resistance index information in the second base 1220 as the site PTP master.

F-2. Dynamic Setting Change Process at Time of Network Environment Change

In the studio corresponding to the second base 1220 which is a non-GM base, the devices 1221 to 1224 corresponding to use equipment such as a broadcasting device are connected to the network relay 1225. Then, at the time of start of operation, the environment of the wide area network line 1240 is in a normal state, and time synchronization can be performed with respect to the network relay 1212 on the GM base 1210 side in any of the devices 1221 to 1223 having the BC function. In such a case, it is assumed that the management node 1201 starts using the studio by arbitrarily setting the device 1223 as the site PTP master and performing time synchronization of each device in the non-GM base 1220, without knowing the network environment resistance index information of each device 1221 to 1224.

Figure 18:
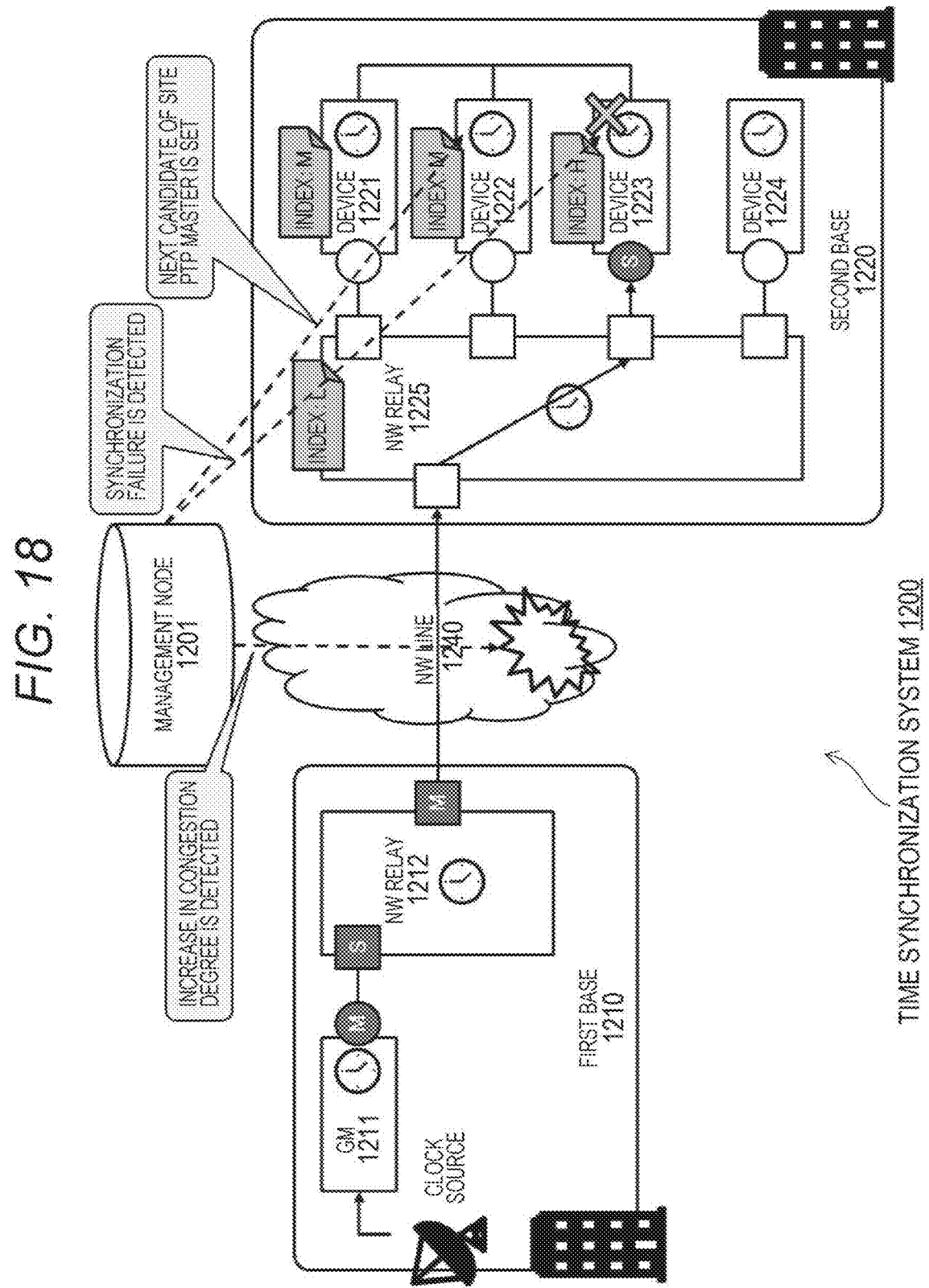
FIG. 18 is a diagram illustrating a dynamic setting change process of the time synchronization system 1200 when a network environment changes.

However, during use of the studio, that is, during operation of the second base 1220, due to a dynamic change in the line status such as an increase in congestion degree of the wide area network line 1240, as illustrated in FIG. 18, there is a case where the device 1223 currently set as the site PTP master cannot perform time synchronization on the second base 1220. In FIG. 18, a mark "x" is attached to the device 1223 that cannot perform the time synchronization.

During use of the studio, that is, during operation of the second base 1220, the management node 1201 constantly monitors congestion of the provided wide area network line 1240. The management node 1201 can monitor congestion of the wide area network line 1240 on the basis of, for example, a result of measuring a jitter or a packet loss rate in the wide area network line 1240.

Accordingly, upon detecting that the time synchronization cannot be performed with high accuracy in the second base 1220 due to the increase in the congestion degree of the wide area network line 1240, the management node 1201 compares the network environment resistance index information associated with each of the other devices 1221 and 1222 and the network relay 1225 in the second base, and selects the next candidate of the site PTP master. In the example illustrated in FIG. 18, the management node 1201 selects the device 1222 with which the next highest index value "M" of the network environment resistance index information is associated as the next candidate for the site PTP master, and changes the setting of PTP master/PTP slave of each device and the on/off setting of the BC function corresponding to the port of each device.

F-3. Dynamic Setting Change Process at Time of Change in System Configuration

Figure 19:
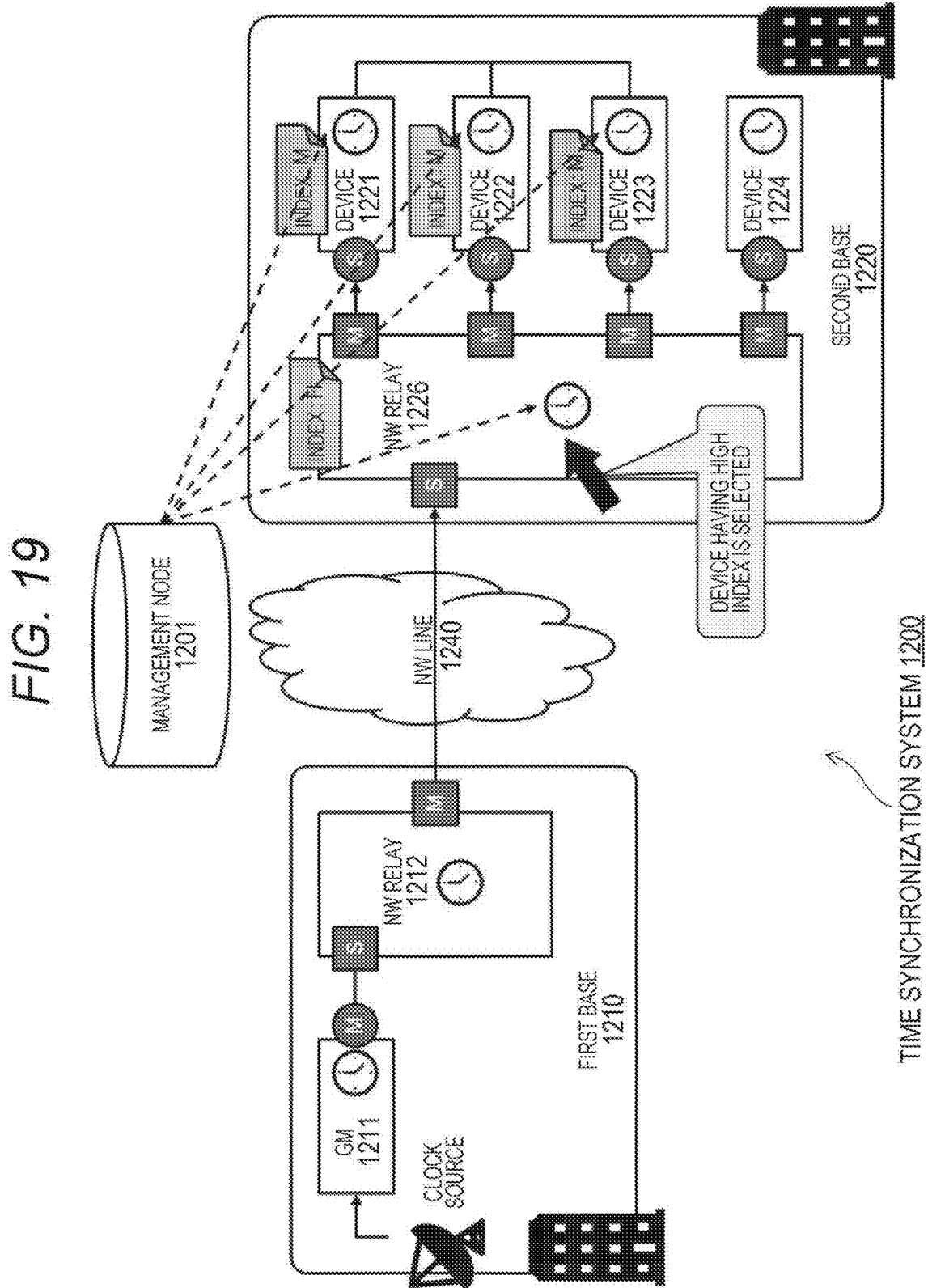
FIG. 19 is a diagram illustrating the dynamic setting change process at a time of change in a system configuration of the time synchronization system 1200.

The system configuration may change after the use of the studio is started, that is, after the operation of the second base 1220 is started. The change in the system configuration here includes replacement or removal of some used equipment, addition of equipment, change in network connection between pieces of equipment, and the like. FIG. 19 illustrates an example in which the network relay 1225 is replaced with a new network relay 1226 in the time synchronization system illustrated in FIG. 12. It is assumed that the new network relay 1226 is a PTP compatible device having the BC function and is an evaluation target of the network environment resistance index information by the management node 1201.

The evaluator (not illustrated) reproduces the provided wide area network line 1240, measures the network environment resistance index information of the network relay 1226, and outputs the network environment resistance index information to the management node 1201. In the example illustrated in FIG. 19, the network environment resistance index information of "H (High)" is measured for the new network relay 1226. The management node 1201 manages the network environment resistance index information acquired from the evaluator in association with the new network relay 1226. Note that, also in a case where any of the devices 1221 to 1223 is replaced or in a case where a new PTP compatible device having the BC function is added to the second base, the network environment resistance index information regarding the new device is similarly measured and associated with the device.

Then, the management node 1201 compares the network environment resistance index information associated with each device 1221 to 1223 and the new network relay 1226, and resets the new network relay 1226 associated with the highest index value "H" of the network environment resistance index information in the second base 1220 as the site PTP master.

F-4. Dynamic Setting Change Process at Time of Change in Network Environment Resistance Index Information As described in item F-1 described above, the network environment resistance index information of each device used in the site is measured in advance before the start of operation, and the management node 1201 manages the network environment resistance index information in association with the device. However, the network environment resistance index information once measured is not necessarily constant, and the network environment resistance index information may change with the lapse of time depending on the device. For example, while the time required before time synchronization is very long, there may be a device in which settings can be changed so that the network environment resistance index information becomes high once the time synchronization is performed.

Figure 20:
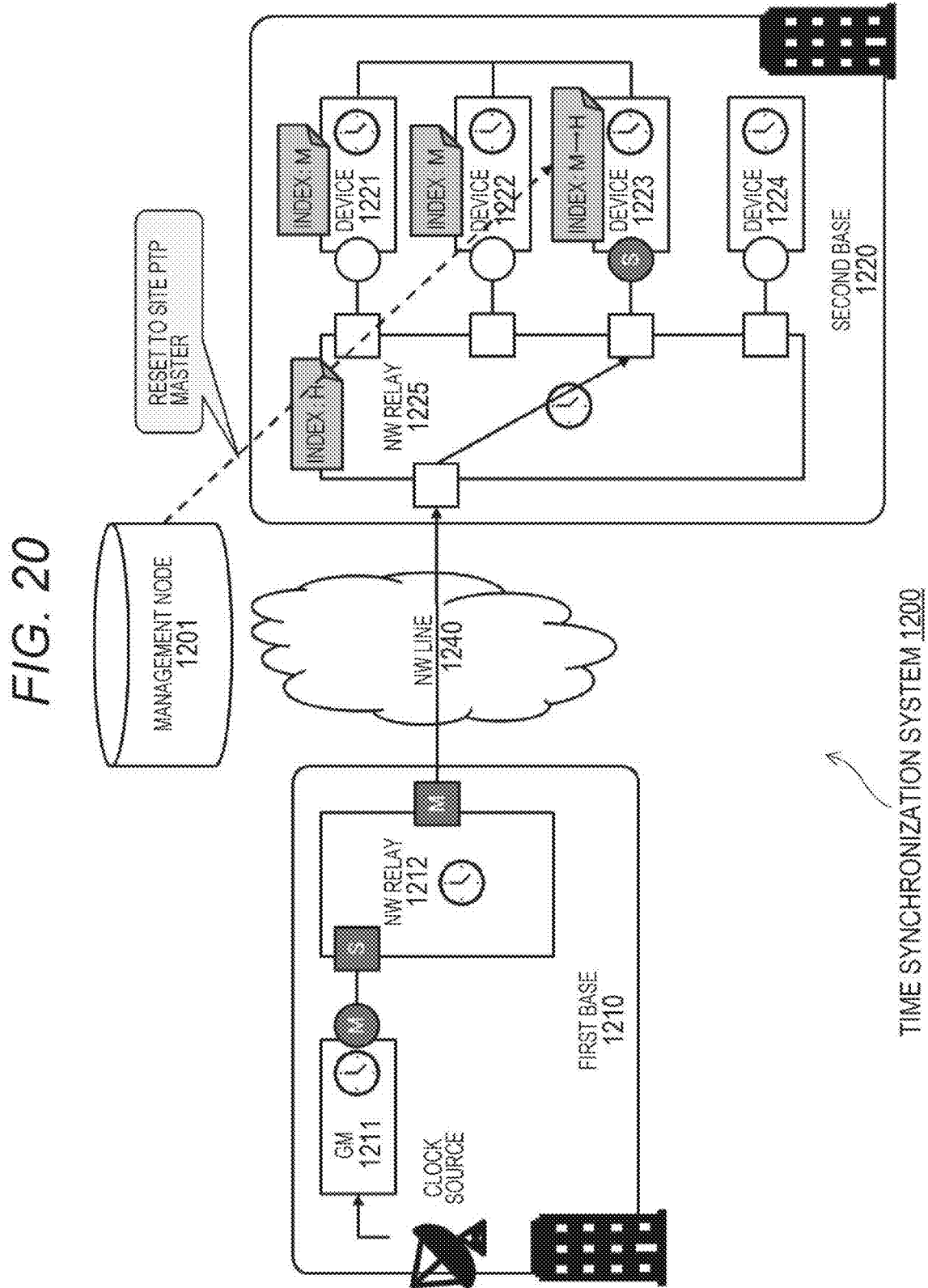
FIG. 20 is a diagram illustrating the dynamic setting change process at a time of change in the network environment resistance index information of the time synchronization system 1200.

In the example illustrated in FIG. 20, before the start of the system operation, pieces of the network environment resistance index information of M, M, M, and L are measured for the device 1221, the device 1222, the device 1223, and the network relay 1225, respectively, but after temporary time synchronization is performed in the second base, the network environment resistance index information of the device 1223 changes from "M" to the highest index value "H". A method for detecting a temporal change in the network environment resistance index information of each device is arbitrary. For example, the network environment resistance index information of each device may be periodically measured using an evaluator during system operation. Alternatively, the management node 1201 may be notified of the network environment resistance index information as setting information of the device.

Then, upon detecting that the setting of the network environment resistance index information of the device 1223 is changed from "M" to the highest index value "H" after the time synchronization is performed in the second base 1220, the management node 1201 resets the device 1223 to the site PTP master.

G. Dynamic Setting Process Considering Number of Network Hops

The network environment resistance index information based on the measurement method described in item C described above is information indicating easiness of time synchronization measured for each device with respect to the network line interposed between the sites. However, the easiness of time synchronization may vary depending on the network configuration in the site where the device is installed.

For example, there is a case where network relays are cascaded to install more devices in a site. In such a case, the number of hops to the grand master varies depending on the installation location of the device. An increase in the number of hops causes a jitter and packet loss, and it is assumed that the resistance of the device to the network environment or the easiness of time synchronization is reduced.

Figure 21:
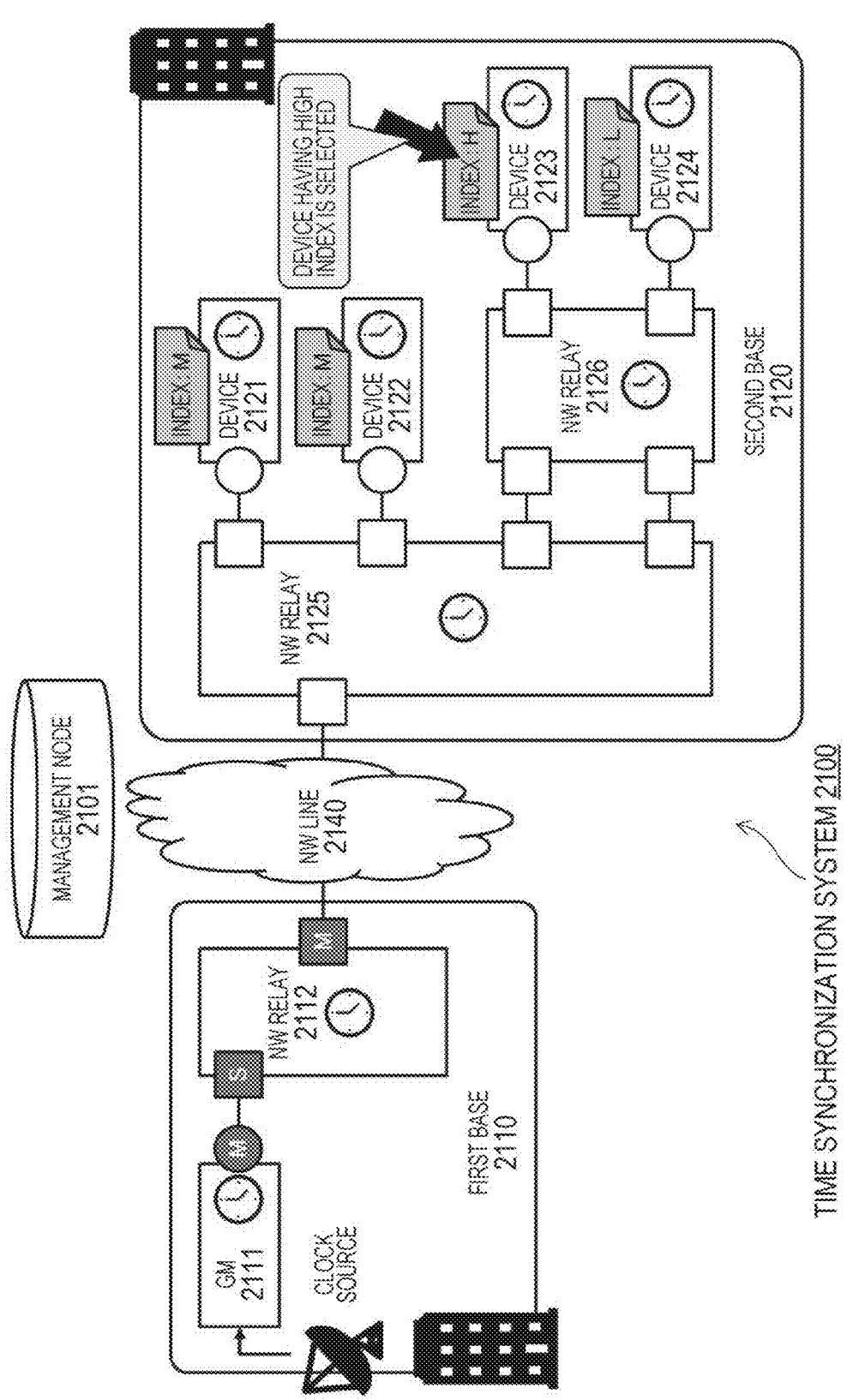
FIG. 21 is a diagram illustrating a dynamic setting change process of a time synchronization system 2100 in consideration of the number of network hops.

The influence of the network configuration (the number of hops to the grand master) on the time synchronization will be considered with a time synchronization system 2100 illustrated in FIG. 21 as an example. The illustrated time synchronization system 2100 includes two sites, a first base 2110 that is a GM base and a second base 2120 that is a non-GM base, and includes a management node 2101. The first base 2110 includes a grand master 2111 and a network relay 2112. Furthermore, the second base 2120 includes devices 2121 to 2124 and two network relays 2125 and 2126.

Describing the network configuration in the second base 2120, the network relay 2125 is connected to the first base 2110 through a wide area network line 2140. Furthermore, the network relay 2126 is cascade-connected to the network relay 2125. The device 2121 and the device 2122 are connected to the network relay 2125, and the device 2123 and the device 2124 are connected to the network relay 2126.

Each of the devices 2121 to 2124 is a PTP compatible device having the BC function, and is an evaluation target of the network environment resistance index information. It is assumed that the evaluator (not illustrated) reproduces the provided wide area network line 2140 to measure the network environment resistance index information of respective devices 2121 to 2124, and obtains respective results of M, M, H, and L. The evaluator outputs the measured network environment resistance index of the respective devices 2121 to 2124 to the management node 2101, and the management node 2101 manages respective pieces of the network environment resistance index information in association with the devices 2121 to 2124.

Figure 22:
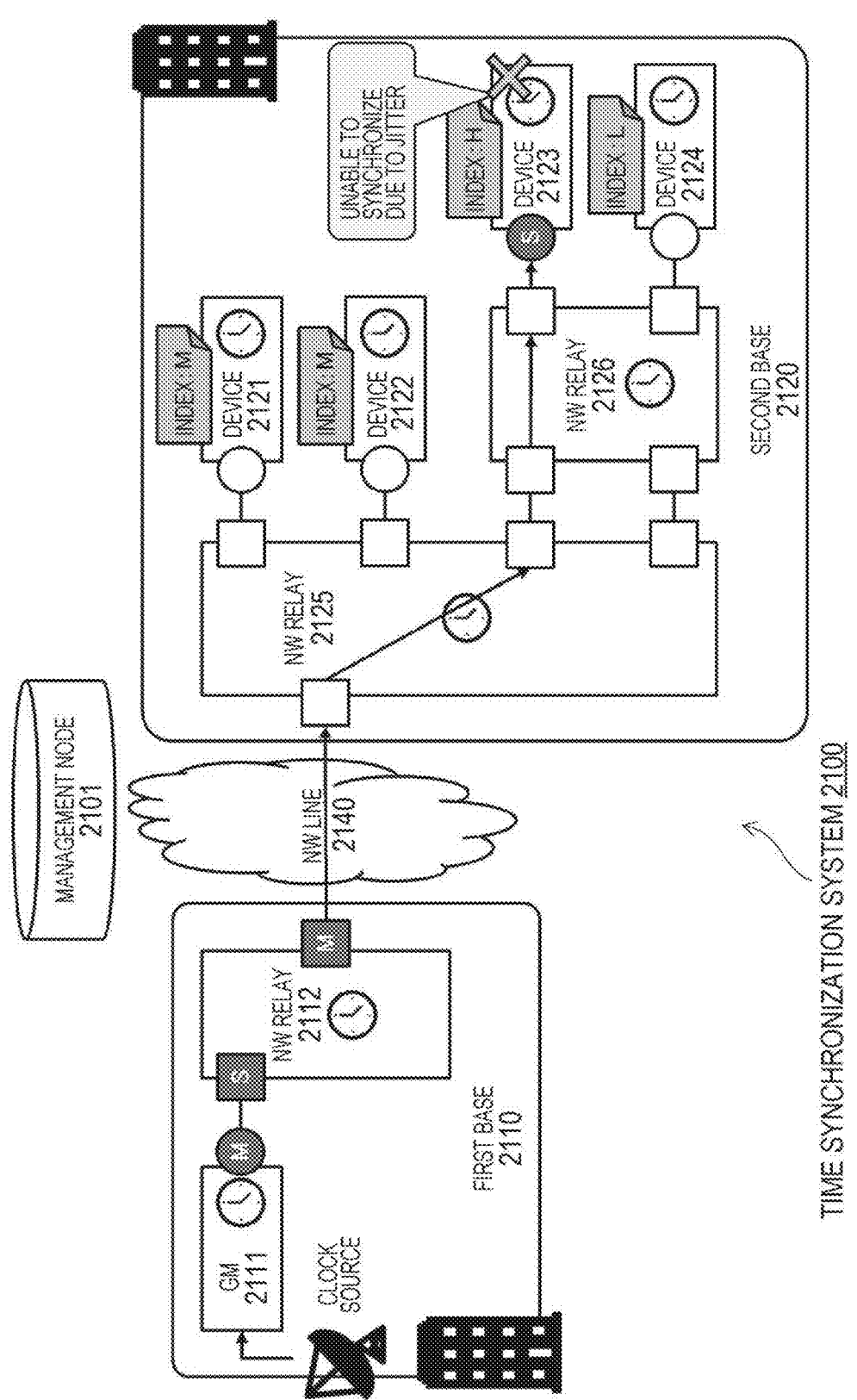
FIG. 22 is a diagram illustrating the dynamic setting change process of the time synchronization system 2100 in consideration of the number of network hops.

In a case where the number of hops to the grand master is not considered, the management node 2101 sets the device 2123 associated with the highest index value "H" of the network environment resistance index information in the second base 2120 as the site PTP master. However, since the device 2123 is connected to the network relay 2126 cascade-connected to the network relay 2125 and has a large number of hops, the time synchronization with the network device 2112 in the GM base 2110 may not be possible due to the jitter generated in the device 2123. In FIG. 22, a mark "x" is attached to the device 2123 that cannot perform the time synchronization.

Figure 23:
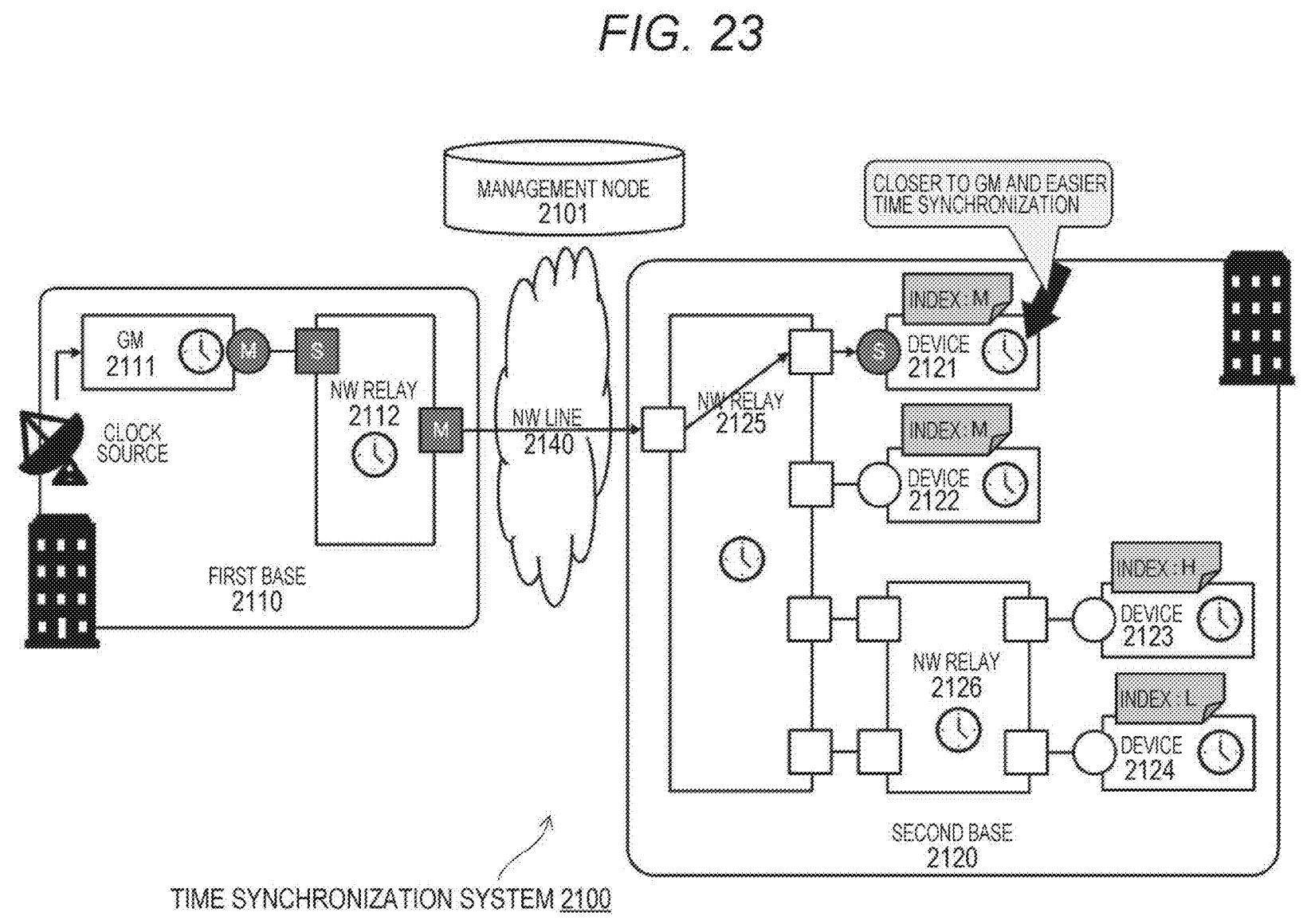

On the other hand, the network environment resistance index information of the device 2121 is "M", which is lower than that of the device 2123. However, since the device 2121 is connected to the network relay 2125, has a small number of hops to the grand master 2111, and is closer to the grand master 2111, time synchronization with the grand master 2111 is easier than with the device 2123. Accordingly, as illustrated in FIG. 23, the management node 2101 adds the number of hops to the grand master to the network environment resistance index information measured for each device (see paragraph 0055), and selects the device 2121 as the site PTP master in consideration of the number of hops to the grand master 2111. Thus, the device 2121 as a PTP slave can perform time synchronization with the network relay 2111 on the first base 2110 side as the PTP master.

Figure 24:
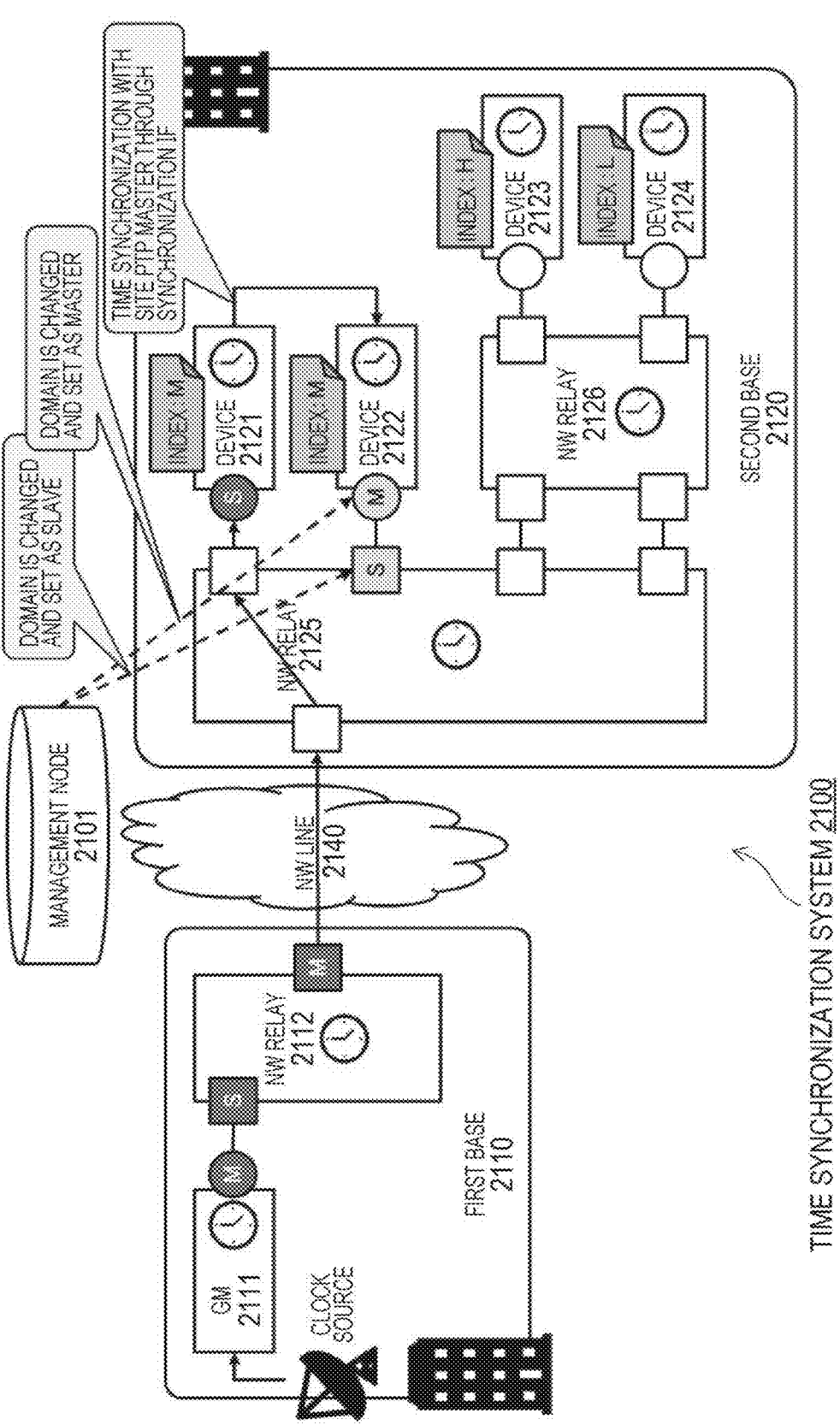
FIG. 24 is a diagram illustrating the dynamic setting change process of the time synchronization system 2100 in consideration of the number of network hops.

Subsequently, as illustrated in FIG. 24, the management node 2101 sets the device 2122 capable of time synchronization with the device 2121 through the external analog interface as the PTP master of another domain (in FIG. 24, ports are colored with different shades of gray for each time synchronization domain). This is to prevent the device 2122 from receiving the PTP packet from which the jitter is not removed from the network relay 2112 in the first base 2110 that is the GM base and performing time synchronization if the original domain is maintained. It is necessary to prevent time synchronization of the device 2122 with the network relay 2111. Furthermore, at the same time, the management node 2101 sets the network relay 2125 to operate as a PTP slave for the device 2122 (in the diagram, "S" indicating that it is a PTP slave is entered in the port connected to the device 2122). Consequently, the network relay 2125 can perform, as a PTP slave, time synchronization with the device 2122 set as the PTP master.

Figure 25:
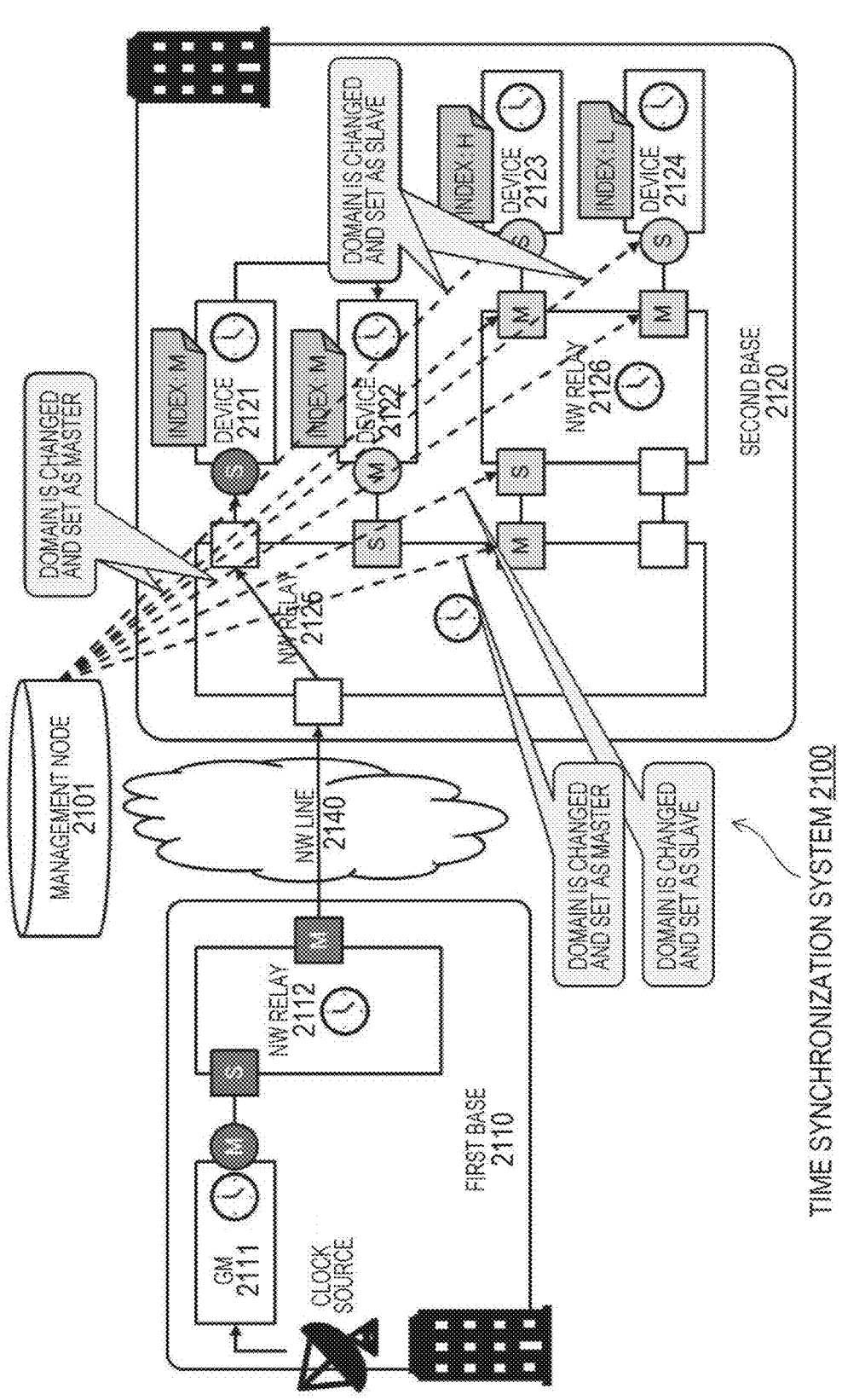
FIG. 25 is a diagram illustrating the dynamic setting change process of the time synchronization system 2100 in consideration of the number of network hops.

Subsequently, as illustrated in FIG. 25, the management node 2501 sets the network relay 2125 as the PTP master of the another domain described above (in the diagram, "M" indicating that it is a PTP master is entered in one of the ports cascade-connected to the network relay 2125 among the plurality of ports included in the network relay 2126). Furthermore, the management node 2501 sets the network relay 2126 as the PTP slave of the another domain described above (in the diagram, "S" indicating that it is a PTP slave is entered in one of the ports cascade-connected to the network relay 2125 among the plurality of ports included in the network relay 2126). Consequently, the network relay 2126 can perform time synchronization with the network relay 2125. Moreover, the management node 2501 sets the network relay 2126 as the PTP master in the another domain described above (in the diagram, "M" indicating that it is a PTP master is entered in each of the ports connected to the device 2123 and the device 2124 among the plurality of ports included in the network relay 2126), and sets each of the devices 2123 and 2124 as the PTP slave in the another domain described above (in the diagram, "S" indicating that it is a PTP slave is entered in each of the ports of the device 2123 and the device 2124). Consequently, the device 2123 and the device 2124 can perform time synchronization with the network relay 2126.

Figure 26:
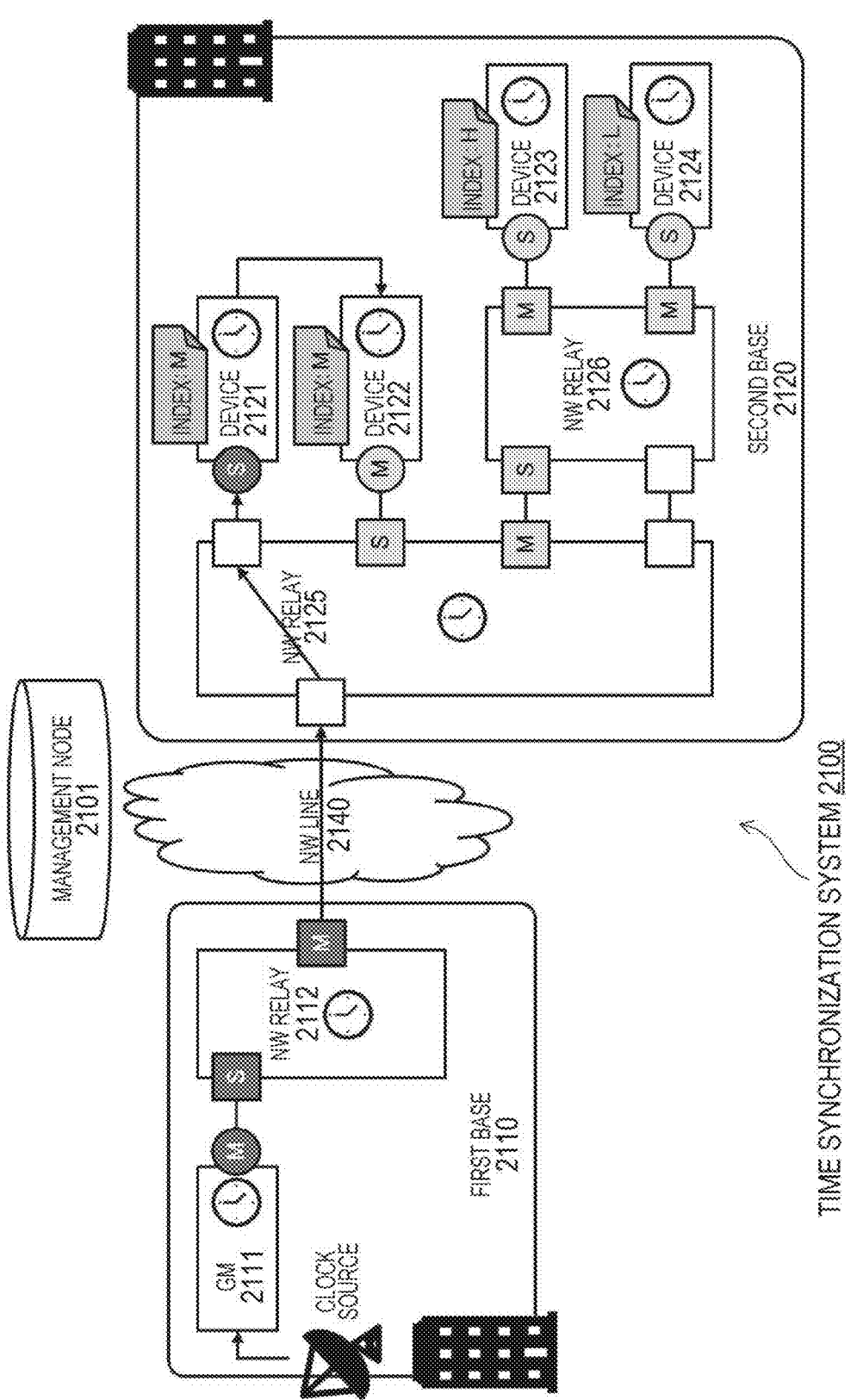
FIG. 26 is a diagram illustrating the dynamic setting change process of the time synchronization system 2100 in consideration of the number of network hops.

Through the operation procedure as illustrated in FIGS. 21 to 25, on/off setting of the BC function and the domain setting corresponding to the port of each device in the time synchronization system 2100 are as illustrated in FIG. 26.

Referring to FIG. 26, the device 2121 with a small number of hops to the grand master 2111 belongs to the same domain as that of the first base 2110 that is the GM base and can perform time synchronization with the network device 2112 in the GM base 2110.

Furthermore, the device 2122 can perform time synchronization with the device 2121 through the external analog interface. Then, the management node 2101 sets the device 2122 as a site PTP master of another domain, sets the network relay 2125 as a PTP slave for the device 2122, sets the network relay 2126 as a PTP slave for the network relay 2125, and sets the device 2123 and the device 2124 as PTP slaves for the network relay 2126. Thus, time synchronization can be performed even in another domain set in the second base 2120.

In this manner, regardless of the network configuration in the second base 2120 that is a non-GM base, all the devices 2121 to 2126 can perform time synchronization with the network devices 2112 in the GM base 2110.

H. Time Synchronization Setting Processing

In this section, a setting process for time synchronization performed by the management node as a main body in the time synchronization system will be described.

Figure 27:
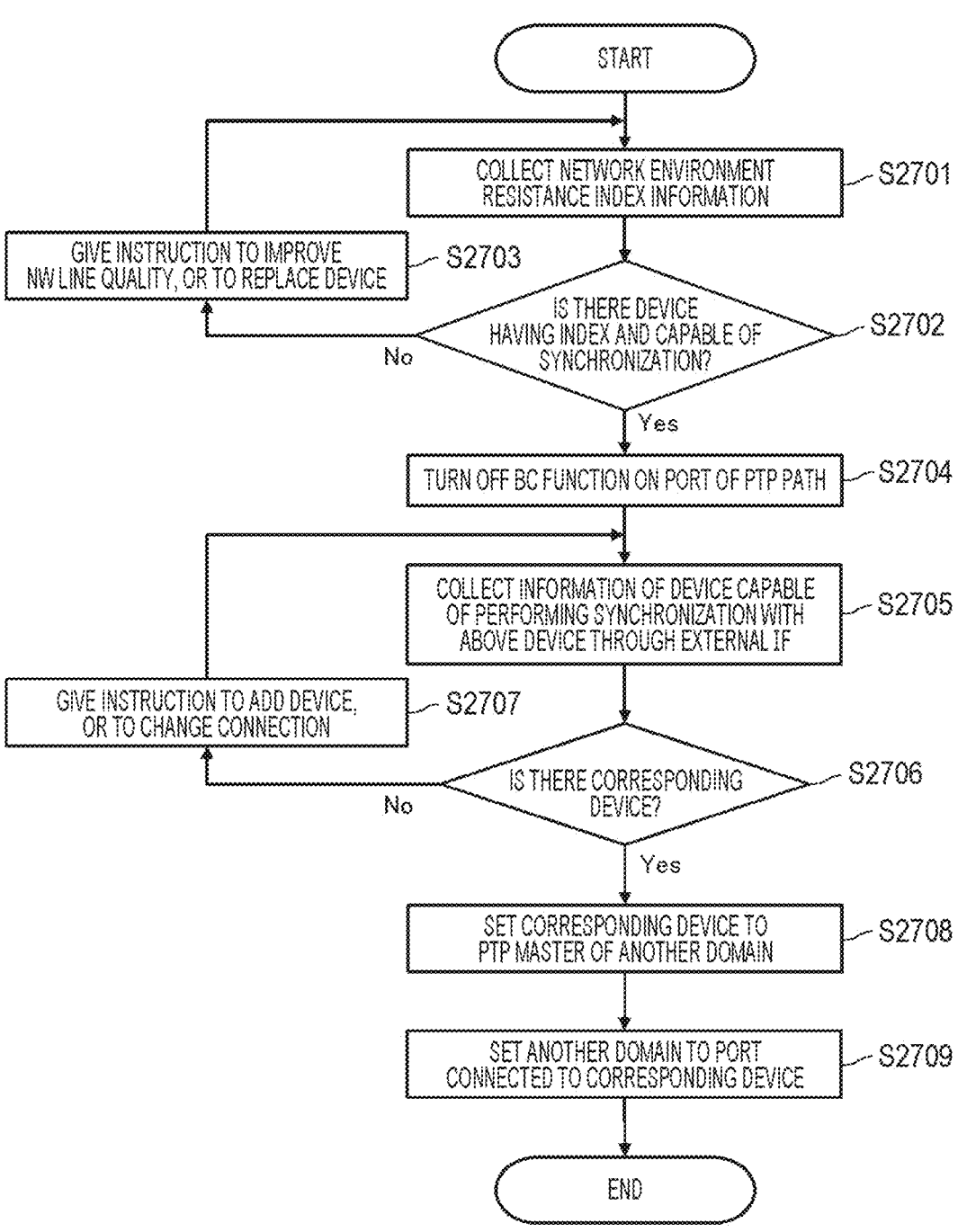
FIG. 27 is a flowchart illustrating an example of a setting processing procedure for time synchronization.

FIG. 27 illustrates an example of a setting processing procedure for time synchronization performed in the time synchronization system in the form of a flowchart. This processing procedure can be applied to achieve time synchronization in a time synchronization system that includes various network configurations including a GM base and one or more non-GM bases and including a management node that manages the network environment resistance index information of a device in each site.

First, the management node collects the network environment resistance index information of each PTP compatible device having the BC function (step S2701).

Then, the management node checks whether there is a device having a network environment resistance index and capable of performing time synchronization with the grand master for the quality of the provided network line (step S2702).

Here, in a case where there is no device having a network environment resistance index and capable of performing time synchronization (No in step S2702), it is necessary to take a measure for enabling time synchronization. In the processing procedure illustrated in FIG. 27, a system administrator or the like is suggested to improve the quality of the network line or introduce or replace with a device having a higher network environment resistance index (step S2703), and the processing returns to step S2701.

On the other hand, in a case where there is a device having a network environment resistance index and capable of performing time synchronization (Yes in step S2702), the management node sets the BC function corresponding to the port on the PTP path connecting the device having the highest network environment resistance index information and the device to be the PTP master to off (step S2704). Consequently, the above-described device having the highest network environment resistance index information can perform, as the site PTP master, time synchronization with the device such as the grand master.

Next, the management node collects information of the above-described device (site PTP master) having the highest network environment resistance index information and a device that can perform time synchronization through the external analog interface (step S2705), and checks whether or not such a device exists (step S2706). The device to be checked in steps S2705 and S2706 is a PTP compatible device having the BC function.

In a case where a device that can perform time synchronization is not found through the external analog interface (No in step S2706), it is necessary to further take a measure for enabling time synchronization. In the processing procedure illustrated in FIG. 27, the system administrator or the like is suggested to add the PTP compatible device having the BC function or change the connection of the external analog interface (step S2707), and the processing returns to step S2705.

In a case where the corresponding device has been found (Yes in step S2707), the management node changes the device to the PTP master and newly sets a domain (step S2708).

Then, the management node newly sets a domain in the port connected to the device set as the PTP master in step S2708 (step S2709), and ends this processing. In the newly set domain, each device can perform time synchronization with the PTP master. Therefore, time synchronization can be implemented in the entire time synchronization system.

Figure 28:
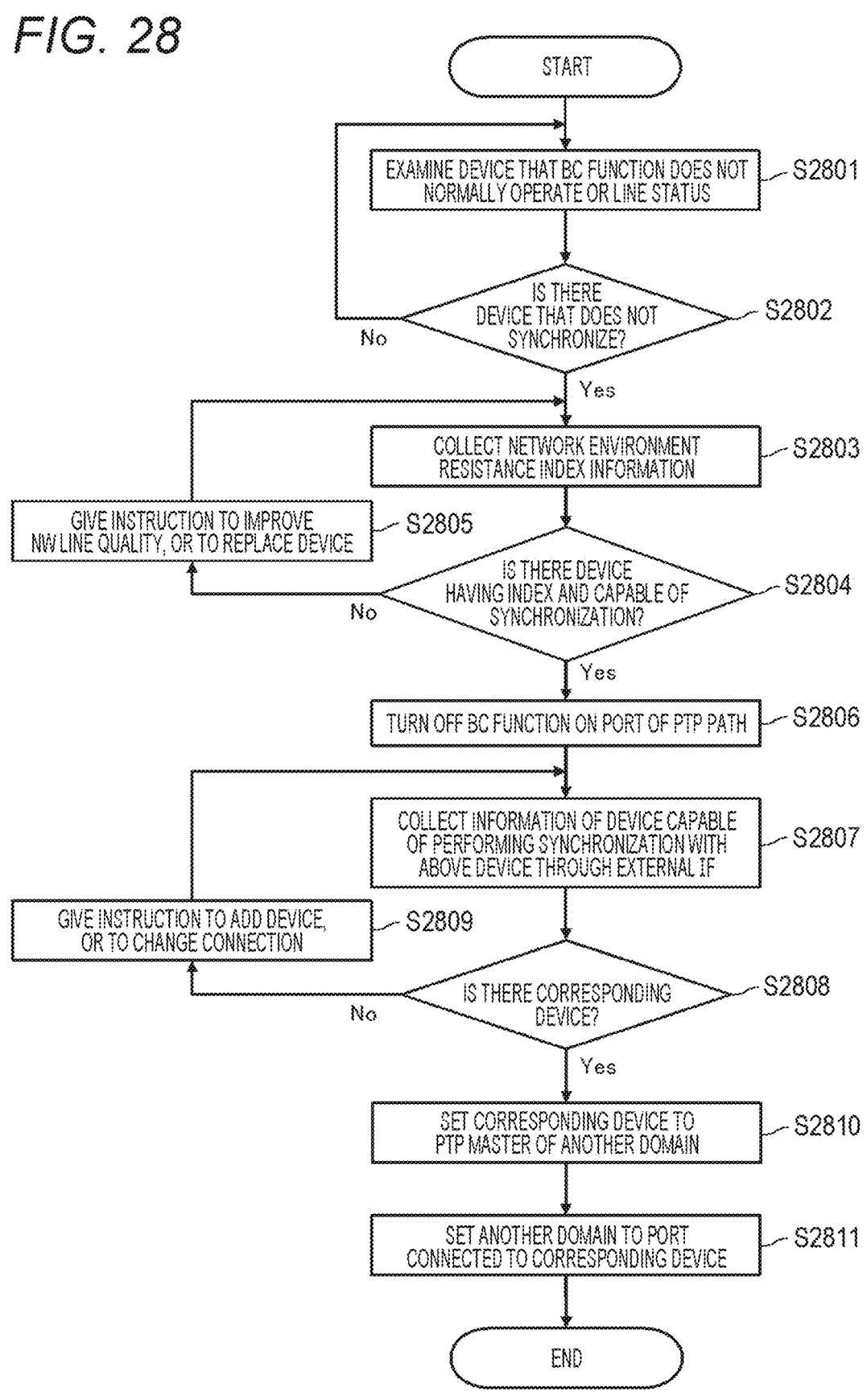
FIG. 28 is a flowchart illustrating another example of the setting processing procedure for time synchronization.

FIG. 28 illustrates another example of a setting processing procedure for time synchronization performed in the time synchronization system in the form of a flowchart. This processing procedure can be applied to achieve time synchronization when a failure occurs in a time synchronization system that includes various network configurations including a GM base and one or more non-GM bases and including a management node that manages the network environment resistance index information of a device in each site.

First, the management node examines the status of a device in which the BC function does not normally operate among the PTP compatible devices having the BC function or a network line (step S2801), and checks whether there is a device that does not perform time synchronization exists (step S2802).

Here, in a case where there is no device that does not perform time synchronization (No in step S2802), the processing returns to step S2801.

On the other hand, in a case where there is a device that does not perform time synchronization (Yes in step S2802), the management node collects the network environment resistance index information of each PTP compatible device having the BC function (step S2803).

Then, the management node checks whether there is a device having a network environment resistance index and capable of performing time synchronization with the grand master for the quality of the provided network line (step S2804).

Here, in a case where there is no device having a network environment resistance index and capable of performing time synchronization (No in step S2804), it is necessary to take a measure for enabling time synchronization. In the processing procedure illustrated in FIG. 28, a system administrator or the like is suggested to improve the quality of the network line or introduce or replace with a device having a higher network environment resistance index (step S2805), and the processing returns to step S2803.

On the other hand, in a case where there is a device having a network environment resistance index and capable of performing time synchronization (Yes in step S2804), the management node sets the BC function corresponding to the port on the PTP path connecting the device having the highest network environment resistance index information and the device to be the PTP master to off (step S2806). Consequently, the above-described device having the highest network environment resistance index information can perform, as the site PTP master, time synchronization with the device such as the grand master.

Next, the management node collects information of the above-described device (site PTP master) having the highest network environment resistance index information and a device that can perform time synchronization through the external analog interface (step S2807), and checks whether or not such a device exists (step S2808). The device to be checked in steps S2807 and S2808 is a PTP compatible device having the BC function.

In a case where a device that can perform time synchronization is not found through the external analog interface (No in step S2808), it is necessary to further take a measure for enabling time synchronization. In the processing procedure illustrated in FIG. 28, the system administrator or the like is suggested to add the PTP compatible device having the BC function or change the connection of the external analog interface (step S2809), and the processing returns to step S2807.

In a case where the corresponding device has been found (Yes in step S2808), the management node changes the device to the PTP master and newly sets a domain (step S2810).

Then, the management node newly sets a domain in the port connected to the device set as the PTP master in step S2810 (step S2811), and ends this processing. In the newly set domain, each device can perform time synchronization with the PTP master. Therefore, even in a case where a failure occurs, the management node can implement time synchronization in the entire time synchronization system by changing the setting of the BC function or the setting of the domain on the basis of the network environment resistance index information.

I. Effects

The effects of the present disclosure will be summarized.

(1) According to the present disclosure, it is possible to define the network environment resistance index information indicating resistance of a PTP compatible device having the BC function to a network environment related to time synchronization, and perform control such as on/off of the BC function of each PTP compatible device on the basis of the network environment resistance index information. Consequently, the time synchronization system can be configured to match the quality of the provided network line.

(2) According to the present disclosure, it is possible to dynamically turn on/off the BC function and change the domain of each PTP compatible device at an arbitrary timing such as at the time of start of system operation, at the time of occurrence of failure during system operation, at the time of replacement or addition of a device, at a change in network line quality, or at a change in resistance of a device to the network environment. Therefore, it is possible to perform time synchronization of the entire time synchronization system by resetting the site PTP master on the basis of the network environment resistance index information at the timing when various events occur.

(3) According to the present disclosure, by measuring the network environment resistance index information of each PTP compatible device according to the network line quality, it is possible to make the criterion for selecting the optimal site PTP master correspond to the change in the network line quality.

INDUSTRIAL APPLICABILITY

The present disclosure has been described in detail above with reference to specific embodiments. However, it is obvious that those skilled in the art can make modifications and substitutions of the embodiment without departing from the gist of the present disclosure.

In the present description, the embodiment in which the present disclosure is applied to a system that performs time synchronization on a network has been mainly described, but the gist of the present disclosure is not limited thereto. The present disclosure can be applied to evaluate a possibility to use the BC function of the PTP compatible device when time synchronization is performed in a base and between bases. Furthermore, the present disclosure can also be used when evaluating resistance of each network relay to a network environment in various types of network systems.

In short, the present disclosure has been described by way of example, and the contents of the description herein should not be interpreted restrictively. In order to determine the gist of the present disclosure, the claims should be taken into consideration.

Note that the technology disclosed herein may have the following configurations.

(1) An information processing apparatus including a control unit that associates a boundary clock function retaining device having a boundary clock function with network environment resistance index information indicating resistance to a network environment related to time synchronization of the boundary clock function retaining device.

(2) The information processing apparatus according to (1) above, in which the network environment resistance index information is information indicating accuracy of the time synchronization of the boundary clock function retaining device corresponding to network environment information indicating the network environment.

(3) The information processing apparatus according to (1) above, in which the network environment resistance index information is information indicating the network environment in a case where accuracy of the time synchronization of the boundary clock function retaining device is equal to or more than a predetermined value.

(4) The information processing apparatus according to (1) above, in which network environment information indicating the network environment is network load information indicating strength of a network load related to the boundary clock function retaining device.

(5) The information processing apparatus according to (4) above, in which the network load information is information generated on the basis of at least one of packet transfer jitter information indicating a packet transfer jitter or packet transfer delay information indicating a packet transfer delay.

(6) The information processing apparatus according to (4) above, in which the network load information is information generated on the basis of packet transfer jitter information indicating a packet transfer jitter and packet transfer delay information indicating a packet transfer delay, and the packet transfer jitter information has a higher contribution rate to the network load information than the packet transfer delay information.

(7) The information processing apparatus according to (1) above, in which network environment information indicating the network environment includes information indicating a number of hops related to the time synchronization of the boundary clock function retaining device.

(8) The information processing apparatus according to any one of (1) to (7) above, in which the control unit generates the network environment resistance index information.

(9) The information processing apparatus according to any one of (1) to (8) above, in which the control unit determines, from among a plurality of the boundary clock function retaining devices connected to a first network line, a first intra-network line master device that performs time synchronization with a second intra-network line device connected by a second network line different from the first network line on the basis of the network environment resistance index information associated with each of the boundary clock function retaining devices.

(10) The information processing apparatus according to (9) above, in which the control unit determines to turn off a boundary clock function corresponding to two ports of a precision time protocol (PTP) path among a plurality of ports included in a boundary clock function retaining passing device that has a boundary clock function and is passed through the PTP path connecting the second intra-network line device and the first intra-network line device that performs time synchronization with the second intra-network line device.

(11) The information processing apparatus according to (9) or (10) above, in which the control unit is directly connected to the first intra-network line master device that performs time synchronization with the second intra-network line device, is capable of performing time synchronization with the first intra-network line master device, and determines a first intra-network line device having only one or two ports as a master device in a domain different from a domain of the second intra-network line device.

(12) The information processing apparatus according to (9) above, in which the control unit determines a precision time protocol (PTP) path that connects the first intra-network line master device and a predetermined first intra-network line device connected by the first network line on the basis of the network environment resistance index information associated with each of the plurality of the boundary clock function retaining devices.

(13) The information processing apparatus according to (12) above, in which the control unit determines on or off of a boundary clock function corresponding to two ports of the PTP path among a plurality of ports included in a boundary clock function retaining passing device that has a boundary clock function and exists in the PTP path on the basis of the network environment resistance index information associated with each of the plurality of the boundary clock function retaining devices.

(14) The information processing apparatus according to (12) above, in which the control unit determines a PTP domain of a passing device and the predetermined first intra-network line device existing in the PTP path among the plurality of first intra-network line devices on the basis of the PTP path.

(15) The information processing apparatus according to any one of (9) to (14) above, in which the control unit determines the first intra-network line master device in response to detecting that a system configuration of the first network line has been changed.

(15-1) The information processing apparatus according to (15) above, in which the change in the system configuration of the first network line includes a change in the network environment or a change in the network environment resistance index information of at least a part of devices in the first network line.

(16) The information processing apparatus according to any one of (9) to (15) above, in which the control unit determines the first intra-network line master device at a time of start of a system of the first network line.

(17) The information processing apparatus according to any one of (9) to (16) above, in which in a case where a failure occurs in at least one of the plurality of the boundary clock function retaining devices, the control unit determines the first intra-network line master device on the basis of the network environment resistance index information associated with each of the boundary clock function retaining devices excluding the boundary clock function retaining device in which the failure has occurred among the plurality of the boundary clock function retaining devices.

(18) The information processing apparatus according to any one of (1) to (17) above, in which the control unit determines whether or not the boundary clock function retaining device is a device capable of performing time synchronization with predetermined or higher accuracy on the basis of the network environment resistance index information and information indicating the network environment associated with the boundary clock function retaining device.

(19) An information processing method including a control step of associating a boundary clock function retaining device having a boundary clock function with network environment resistance index information indicating resistance to a network environment related to time synchronization of the boundary clock function retaining device.

(20) A computer program described in a computer-readable form, the computer program causing a computer to function as a control unit that associates a boundary clock function retaining device having a boundary clock function with network environment resistance index information indicating resistance to a network environment related to time synchronization of the boundary clock function retaining device.

REFERENCE SIGNS LIST

100 Time synchronization system
110 First base
111 Grand master
112 Device
113 Network relay
120 Second base
121, 122 Device
123 Network relay
130 Third base
131, 132, 133 Device
134 Network relay
140 Network
200 Time synchronization system
210 First base
211 Grand master
212 Device
213 Network relay
220 Second base
221, 222 Device
223 Network relay
240 Network
300 Evaluation system
301 Grand master
302 Device
303 Network Emulator
304 Evaluator
400 Time synchronization system
401 Management node
410 Base (GM base)
411 Grand master
412 Network relay
420 Base (non-GM base)
421 to 423 Device (PTP compatible device having BC function)

424 Device (PTP compatible device not having BC function)
425 Network relay
440 Network line
1200 Time synchronization system
1201 Management node
1210 Base (GM base)
1211 Grand master
1212 Network relay
1220 Base (non-GM base)
1221 to 1224 Device
1225, 1226 Network relay
1240 Network line
2100 Time synchronization system
2101 Management node
2110 Base (GM base)
2111 Grand master
2112 Network relay
2120 Base (non-GM base)
2121 to 2124 Device
2125, 2126 Network relay
2140 Network line

The invention claimed is:

1. An information processing method, comprising associating a boundary clock function retaining device having a boundary clock function with network environment resistance index information indicating resistance to a network environment related to time synchronization of the boundary clock function retaining device; and controlling the boundary clock function retaining device based on the associated network environment resistance index information, wherein the network environment resistance index information is determined based on measurement of at least one of a phase difference or a frequency shift of a synchronization signal on a side of the boundary clock function retaining device.

2. A non-transitory computer-readable storage medium having embodied thereon a computer program, which when executed by a computer causes the computer to execute a method, the method comprising:

associating a boundary clock function retaining device having a boundary clock function with network environment resistance index information indicating resistance to a network environment related to time synchronization of the boundary clock function retaining device; and controlling the boundary clock function retaining device based on the associated network environment resistance index information, wherein the network environment resistance index information is determined based on measurement of at least one of a phase difference or a frequency shift of a synchronization signal on a side of the boundary clock function retaining device.

3. An information processing apparatus comprising circuitry configured to associate a boundary clock function retaining device having a boundary clock function with network environment resistance index information indicating resistance to a network environment related to time synchronization of the boundary clock function retaining device, and control the boundary clock function retaining device based on the associated network environment resistance index information, wherein the network environment resistance index information is determined based on measurement of at least one of a phase difference or a frequency shift of a synchronization signal on a side of the boundary clock function retaining device.

4. The information processing apparatus according to claim 3, wherein the network environment resistance index information includes information indicating accuracy of the time synchronization of the boundary clock function retaining device corresponding to network environment information indicating the network environment.

5. The information processing apparatus according to claim 3, wherein the network environment resistance index information includes information indicating the network environment in a case where accuracy of the time synchronization of the boundary clock function retaining device is equal to or more than a predetermined value.

6. The information processing apparatus according to claim 3, wherein network environment information indicating the network environment includes network load information indicating strength of a network load related to the boundary clock function retaining device.

7. The information processing apparatus according to claim 6, wherein the network load information includes information generated based on at least one of packet transfer jitter information indicating a packet transfer jitter or packet transfer delay information indicating a packet transfer delay.

8. The information processing apparatus according to claim 6, wherein the network load information includes information generated based on packet transfer jitter information indicating a packet transfer jitter and packet transfer delay information indicating a packet transfer delay, and wherein the packet transfer jitter information has a higher contribution rate to the network load information than the packet transfer delay information.

9. The information processing apparatus according to claim 3, wherein network environment information indicating the network environment includes information indicating a number of hops related to the time synchronization of the boundary clock function retaining device.

10. The information processing apparatus according to claim 3, wherein the circuitry generates the network environment resistance index information.

11. The information processing apparatus according to claim 3, wherein the circuitry determines, from among a plurality of the boundary clock function retaining devices connected to a first network line, a first intra-network line master device that performs time synchronization with a second intra-network line device connected by a second network line different from the first network line based on the network environment resistance index information associated with each of the boundary clock function retaining devices.

12. The information processing apparatus according to claim 11, wherein the circuitry determines to turn off a boundary clock function corresponding to two ports of a precision time protocol (PTP) path among a plurality of ports included in a boundary clock function retaining passing device that has a boundary clock function and is passed through the PTP path connecting the second intra-network line device and the first intra-network line device that performs time synchronization with the second intra-network line device.

13. The information processing apparatus according to claim 11, wherein the circuitry is directly connected to the first intra-network line master device that performs time synchronization with the second intra-network line device, and wherein the circuitry is further configured to perform time synchronization with the first intra-network line master device, and determine a first intra-network line device having only one or two ports as a master device in a domain different from a domain of the second intra-network line device.

14. The information processing apparatus according to claim 11, wherein the circuitry determines a precision time protocol (PTP) path that connects the first intra-network line master device and a predetermined first intra-network line device connected by the first network line based on the network environment resistance index information associated with each of the plurality of the boundary clock function retaining devices.

15. The information processing apparatus according to claim 14, wherein the circuitry determines on or off of a boundary clock function corresponding to two ports of the PTP path among a plurality of ports included in a boundary clock function retaining passing device that has a boundary clock function and exists in the PTP path based on the network environment resistance index information associated with each of the plurality of the boundary clock function retaining devices.

16. The information processing apparatus according to claim 14, wherein the circuitry determines a PTP domain of a passing device and the predetermined first intra-network line device existing in the PTP path among the plurality of first intra-network line devices based on the PTP path.

17. The information processing apparatus according to claim 11, wherein the circuitry determines the first intra-network line master device in response to detecting that a system configuration of the first network line has been changed.

18. The information processing apparatus according to claim 11, wherein the circuitry determines the first intra-network line master device at a time of start of a system of the first network line.

19. The information processing apparatus according to claim 11, wherein in a case where a failure occurs in at least one of the plurality of the boundary clock function retaining devices, the circuitry determines the first intra-network line master device based on the network environment resistance index information associated with each of the boundary clock function retaining devices excluding the boundary clock function retaining device in which the failure has occurred among the plurality of the boundary clock function retaining devices.

20. The information processing apparatus according to claim 3, wherein the circuitry determines whether or not the boundary clock function retaining device is a device configured to perform time synchronization with predetermined or higher accuracy based on the network environment resistance index information and information indicating the network environment associated with the boundary clock function retaining device.

\* \* \* \* \*